United States Patent
Hoang

(10) Patent No.: US 10,716,969 B2
(45) Date of Patent: Jul. 21, 2020

(54) NETWORKED EXERCISE DEVICES WITH SHARED VIRTUAL TRAINING

(71) Applicant: Aviron Interactive Inc., Toronto (CA)

(72) Inventor: Andy Hoang, Toronto (CA)

(73) Assignee: Aviron Interactive Inc., Toronto, Ontario (CA)

( * ) Notice: Subject to any disclaimer, the term of this patent is extended or adjusted under 35 U.S.C. 154(b) by 165 days.

(21) Appl. No.: 15/797,789

(22) Filed: Oct. 30, 2017

(65) Prior Publication Data

US 2019/0126099 A1 May 2, 2019

(51) Int. Cl.
*A63B 24/00* (2006.01)
*A63B 71/06* (2006.01)
(Continued)

(52) U.S. Cl.
CPC ...... *A63B 24/0075* (2013.01); *A63B 21/0058* (2013.01); *A63B 21/00192* (2013.01); *A63B 21/225* (2013.01); *A63B 24/0062* (2013.01); *A63B 24/0084* (2013.01); *A63B 24/0087* (2013.01); *A63B 71/0622* (2013.01); *A63F 13/24* (2014.09); *A63F 13/335* (2014.09); *A63F 13/428* (2014.09); *A63F 13/67* (2014.09); *A63F 13/795* (2014.09); *A63F 13/798* (2014.09);
(Continued)

(58) Field of Classification Search
CPC ............ A63B 24/0075; A63B 24/0087; A63B 21/0058; A63B 21/225; A63B 24/0084; A63B 21/00192; A63B 71/0622; A63B 24/0062; A63B 2220/17; A63B 2220/20; A63B 2220/30; A63B 2230/75; A63B 2230/06; A63B 2022/0079; A63B 22/0076; A63B 2225/50; A63B 2225/20; A63B 2220/806; A63B 2071/0638; A63B 2024/0096; A63B 2024/0081; A63B 2225/682; A63F 13/816; A63F 13/67; A63F 13/428; A63F 13/798; A63F 13/335; A63F 13/24; A63F 13/85; A63F 13/795
See application file for complete search history.

(56) References Cited

U.S. PATENT DOCUMENTS 5,362,069 A 11/1994 Hall-Tipping
5,474,083 A * 12/1995 Church ............... A61B 5/0488
600/546
(Continued)

*Primary Examiner* — Garrett K Atkinson
(74) *Attorney, Agent, or Firm* — Ridout & Maybee LLP

(57) ABSTRACT

A system having networked exercise devices that can have a shared virtual exercise session for training, collaboration or competition. The exercise devices each have adjustable difficulty setting and a touch screen for displaying different virtual exercise sessions. The touch screen can display a representation, such as one or more avatars, that represent users of the exercise devices, and that have a virtual speed in proportion to exercise performance on the exercise devices. Dynamic adjustment can be made based on the collective performance of the exercise devices, to cause a same adjustment to a respective current difficulty setting of at least one, two or more exercise devices during the shared virtual exercise session. Virtual training can be provided by way of a chaser animation that chases the representation of the exercise devices, the chaser animation having a virtual speed in dependence of exercise performance of users of the exercise devices.

26 Claims, 22 Drawing Sheets

(51) Int. Cl.
*A63B 21/00* (2006.01)
*A63B 21/22* (2006.01)
*A63B 21/005* (2006.01)
*A63F 13/795* (2014.01)
*A63F 13/85* (2014.01)
*A63F 13/24* (2014.01)
*A63F 13/335* (2014.01)
*A63F 13/798* (2014.01)
*A63F 13/428* (2014.01)
*A63F 13/67* (2014.01)
*A63F 13/816* (2014.01)
*A63B 22/00* (2006.01)

(52) U.S. Cl.
CPC ............ *A63F 13/816* (2014.09); *A63F 13/85* (2014.09); *A63B 22/0076* (2013.01); *A63B 2022/0079* (2013.01); *A63B 2024/0081* (2013.01); *A63B 2024/0096* (2013.01); *A63B 2071/0638* (2013.01); *A63B 2220/17* (2013.01); *A63B 2220/20* (2013.01); *A63B 2220/30* (2013.01); *A63B 2220/806* (2013.01); *A63B 2225/20* (2013.01); *A63B 2225/50* (2013.01); *A63B 2225/682* (2013.01); *A63B 2230/06* (2013.01); *A63B 2230/75* (2013.01)

(56) References Cited

U.S. PATENT DOCUMENTS

| | | | |
|---|---|---|---|
| 5,888,172 A | 3/1999 | Andrus et al. | |
| 5,890,995 A | 4/1999 | Bobick et al. | |
| 6,013,007 A * | 1/2000 | Root | A63B 24/0006 482/8 |
| 6,347,290 B1 * | 2/2002 | Bartlett | G06F 1/1626 702/150 |
| 6,902,513 B1 | 6/2005 | McClure | |
| 6,921,351 B1 | 7/2005 | Hickman et al. | |
| 7,628,730 B1 * | 12/2009 | Watterson | A63B 21/005 482/8 |
| 7,695,406 B2 | 4/2010 | Waters | |
| 7,789,800 B1 * | 9/2010 | Watterson | A63B 21/005 |
| 8,029,415 B2 * | 10/2011 | Ashby | G06F 19/3481 482/49 |
| 8,939,831 B2 | 1/2015 | Dugan | |
| 9,028,368 B2 * | 5/2015 | Ashby | G06F 19/3481 482/1 |
| 9,174,085 B2 | 11/2015 | Foley et al. | |
| 9,308,417 B2 * | 4/2016 | Grundy | A63B 24/0062 |
| 9,530,325 B2 * | 12/2016 | Hall | G09B 5/065 |
| 9,579,542 B2 | 2/2017 | Quinn et al. | |
| 10,052,518 B2 * | 8/2018 | Lagree | A63B 22/0087 |
| 2001/0011025 A1 * | 8/2001 | Ohki | H04B 1/086 455/556.1 |
| 2004/0263473 A1 * | 12/2004 | Cho | G06F 3/014 345/156 |
| 2007/0123390 A1 | 5/2007 | Mathis | |
| 2007/0197274 A1 | 8/2007 | Dugan | |
| 2007/0254778 A1 | 11/2007 | Ashby | |
| 2009/0270227 A1 * | 10/2009 | Ashby | A63B 22/0023 482/8 |
| 2011/0071003 A1 * | 3/2011 | Watterson | A63B 21/005 482/8 |
| 2012/0220427 A1 * | 8/2012 | Ashby | A63B 22/0023 482/4 |
| 2012/0323346 A1 * | 12/2012 | Ashby | A63B 21/005 700/91 |
| 2014/0087341 A1 * | 3/2014 | Hall | G09B 5/065 434/258 |
| 2014/0194251 A1 | 7/2014 | Reich et al. | |
| 2014/0330186 A1 * | 11/2014 | Hyde | A61F 5/02 602/19 |
| 2015/0238817 A1 * | 8/2015 | Watterson | A63B 22/0023 482/8 |
| 2016/0271452 A1 * | 9/2016 | Lagree | A63B 22/0087 |
| 2017/0065873 A1 * | 3/2017 | Hall | G09B 5/065 |
| 2017/0172466 A1 * | 6/2017 | Eriksson | A61B 5/0004 |
| 2018/0154240 A1 * | 6/2018 | Hall | G09B 5/065 |
| 2019/0282857 A1 * | 9/2019 | Hapola | A63B 22/0605 |

* cited by examiner

NETWORKED EXERCISE DEVICES WITH SHARED VIRTUAL TRAINING

TECHNICAL FIELD

At least some example embodiments relate to exercise devices and equipment and, more particularly, to methods and systems for networked exercise devices with shared virtual training.

BACKGROUND

Some industry exercise bikes have a display screen that allows a user to treat the exercise as a game. The display screen can illustrate hills and valleys, for example, and the resistance of the pedals is increased or decreased accordingly. The user can also self control the amount of resistance of the pedals. However, this has limited applicability as the user may not know if the exercise session is at the appropriate level of difficulty. Further, exercising by oneself can be an isolating experience that may not maximize performance that can arise from competition or collaboration with others.

Additional difficulties with existing systems may be appreciated in view of the Detailed Description of Example Embodiments, below.

SUMMARY

A system having networked exercise devices that can have a shared virtual exercise session for training, collaboration or competition. The exercise devices each have an adjustable difficulty setting and a touch screen. The touch screen can be used to select from different virtual exercise sessions. The touch screen can display at least one representation, such as one or more avatars, that represent users of the exercise devices, and that have a virtual speed in proportion to exercise performance on the exercise devices. The representation can include real-time video of users captured from their front facing cameras. Dynamic adjustment can be made based on the collective performance of at least one, two or more of the exercise devices, to cause a same adjustment to a respective current difficulty setting of at least one, two or more exercise devices during the shared virtual exercise session. Virtual training can be provided by way of trainer, peers or a chaser animation that chases the at least one representation of the exercise devices, the chaser animation having a virtual speed in dependence of exercise performance of users of the exercise devices.

Virtual training methods can include, for example:

1) Trainer (human). One exercise device receives a user input command from the trainer to cause a same adjustment to a respective current difficulty setting of at least one, two or more exercise devices during the shared virtual exercise session. Professional trainer or leader.

2) User on another machine (human). Same as trainer (human), but performed by peer user on their exercise device.

3) Artificial Intelligence (AI) as trainer (determined by Cloud Server). For example, AI mimics human trainer. This is performed by an AI engine on a cloud server. It is not localized because adjustments can be performed on multiple equipment simultaneously. Dynamic adjustment can be made based on the real time collective performance of at least one, two or more of the exercise devices, to cause a same adjustment to a respective current difficulty setting of at least one, two or more exercise devices during the shared virtual exercise session.

4) AI (determined by Cloud Server) as challenge or chaser and in real time, places objects into virtual workout world that increases and decreases resistance. It is not localized because adjustments can be performed on multiple equipment simultaneously. A chaser animation has a virtual speed in dependence of exercise performance of users of the exercise devices.

5) Pre-set program (determined by Cloud Server). This is not localized because adjustments can be performed on multiple equipment simultaneously. In one example, this is dependent on historical exercise performance of users of the exercise devices.

In accordance with an example embodiment, there is generally provided a system having networked exercise devices that can have a shared virtual exercise session for training, collaboration or competition. The exercise devices each have adjustable difficulty setting and a touch screen for displaying different virtual exercise sessions. The touch screen can display a representation, such as one or more avatars, that represent users of the exercise devices, and that have a virtual speed in proportion to exercise performance on the exercise devices. Dynamic adjustment can be made based on the real time collective performance of at least one, two or more the exercise devices, to cause a same adjustment to a respective current difficulty setting of at least one, two or more exercise devices during the shared virtual exercise session. Virtual training can be provided by way of a chaser animation that chases the representation of the exercise devices, the chaser animation having a virtual speed in dependence of exercise performance of users of the exercise devices.

An example embodiment is an exercise device for a shared virtual exercise session with one or more other exercise devices over a network, each of the other exercise devices having a respective exercise apparatus having an adjustable difficulty setting, the exercise device comprising: an exercise apparatus having an adjustable difficulty setting; a display screen configured to display a graphical interface; a user input device; a communication subsystem for communicating over the network; memory; and at least one processor in operable communication with the display screen, the user input device, a control of the adjustable difficulty setting, and the memory, for executing instructions stored in the memory that, when executed, cause the at least one processor to: display on the graphical interface, based on communication over the network, at least one representation of users of the exercise devices during the shared virtual exercise session, control the adjustable difficulty setting of the exercise apparatus to one or more of the difficulty settings during the shared virtual exercise session, receive a user input command from the user input device during the shared virtual exercise session, and in response to the user input command, cause a same adjustment to a respective current difficulty setting of at least two of the exercise devices during the shared virtual exercise session.

Another example embodiment is an exercise device for a shared virtual exercise session with one or more other exercise devices over a network, each of the other exercise devices having a respective exercise apparatus having an adjustable difficulty setting, the exercise device comprising: an exercise apparatus having an adjustable difficulty setting; a display screen configured to display a graphical interface; a communication subsystem for communicating over the network; memory; and at least one processor in operable communication with the display screen, a control of the adjustable difficulty setting, and the memory, for executing instructions stored in the memory that, when executed, cause the at least one processor to: display on the graphical interface, based on communication over the network, at least one representation of the exercise devices during the shared virtual exercise session, the at least one representation having a virtual speed on the graphical interface based on exercise performance of the exercise devices, and display on the graphical interface an animation that chases the at least one representation of the exercise devices during the shared virtual exercise session, and, when reaching the at least one representation on the graphical interface, ends at least part of the shared virtual exercise session for at least one of the exercise devices, the animation having a virtual speed that is dependent on exercise performance of at least one of the exercise devices.

Another example embodiment is a system for a shared virtual exercise session over a network with a plurality of exercise devices, each of the exercise devices having a respective exercise apparatus having an adjustable difficulty setting, and each of the exercise devices having a respective display screen for displaying a respective graphical interface, the system comprising: a communication subsystem for communicating with the plurality of exercise devices; memory; and at least one processor in operable communication with the communication subsystem and the memory, for executing instructions stored in the memory that, when executed, cause the at least one processor to: determine a respective performance target of each respective user of each exercise device for the shared virtual exercise session, receive data from each exercise device relating to exercise performance of the respective exercise device; send data to each exercise device for outputting at least one representation of the exercise devices to the respective graphical interface during the shared virtual exercise session, and command, when the exercise performance of the exercise devices during the shared virtual exercise session satisfies criteria based on the performance targets of the exercise devices, at least two of the exercise devices to perform a same adjustment to a respective current difficulty setting of the respective exercise device.

In accordance with an example embodiment, there is provided a non-transitory computer-readable medium containing instructions executable by a processor for performing any one of or all of the described methods. In accordance with an example embodiment, there is provided a processor-implemented method for performing any one of or all of the described functions described with respect to any of the processors.

BRIEF DESCRIPTION OF THE DRAWINGS

Reference will now be made, by way of example, to the accompanying drawings that show example embodiments, in that.

Similar reference numerals may be used in different figures to denote similar components.

DETAILED DESCRIPTION OF EXAMPLE EMBODIMENTS

In accordance with an example embodiment, there is generally provided a system having networked exercise devices that can have a shared virtual exercise session for training, collaboration or competition. The exercise devices each have adjustable difficulty setting and a touch screen. The touch screen can be used to select from different virtual exercise sessions. The touch screen can display at least one representation, such as one or more avatars, that represent users of the exercise devices, and that have a virtual speed in proportion to exercise performance on the exercise devices. The representation can include real-time video of users captured from their front facing cameras.

Figure 1:
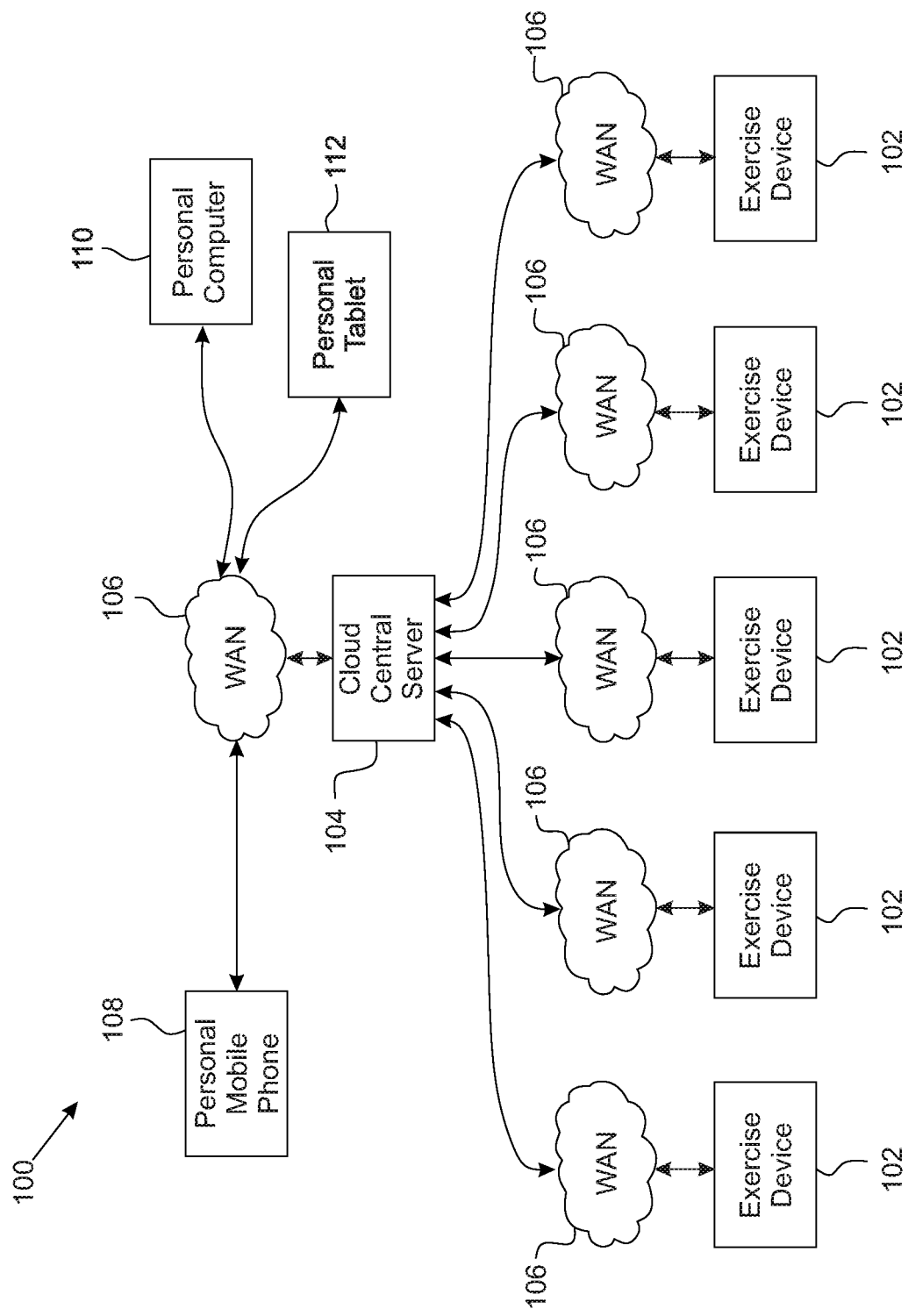
FIG. 1 illustrates a block diagram of a system for a shared virtual exercise session between exercise devices, in accordance with an example embodiment.

Reference is first made to FIG. 1, that illustrates a block diagram of a system 100 for a shared virtual exercise session between exercise devices 102, in accordance with an example embodiment. A server such as a cloud server (also known as "cloud central server") 104 can be configured to provide application services to the exercise devices 102. In some example embodiments, example exercise devices 102 include a rower, a bike, a stepper, an elliptical, a treadmill, etc. The exercise devices 102, in an example embodiment, generally allow users to participate in a variety of challenges in real time: e.g., individually and alone; individually against others; individually with others as a team.

The cloud central server 104 and the exercise devices 102 are configured to communicate over one or more networks, such as Wide Area Network (WAN) 106 and/or the Local Area Network (LAN) (not shown). The cloud central server 104 can also be configured as a portal for access by web applications or other applications from communication devices, such as personal mobile phone 108, personal computer 110, and personal tablet 112. In an example embodiment, the cloud central server 104 is hosted by Google™ Cloud Platform, as understood in the art. The cloud central server 104 can comprise one or more processors and one or more memory.

Figure 2:
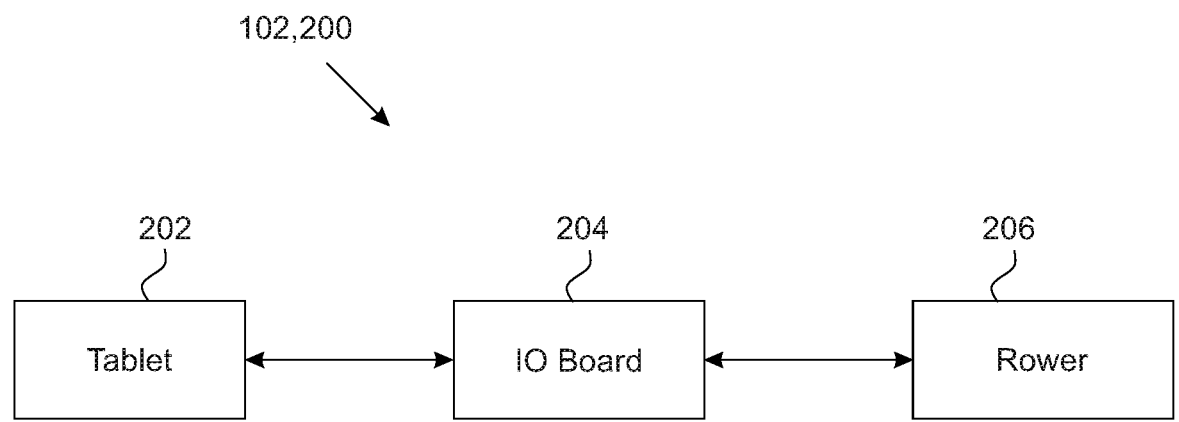
FIG. 2 illustrates a block diagram of an exercise device for use in the system of FIG. 1, in accordance with an example embodiment.

FIG. 2 illustrates a block diagram of an example embodiment of one of the exercise devices 102, for example a rower 200. The rower 200 includes a tablet 202, an Input/Output (TO) Board 204, and a rower apparatus 206. The tablet 202 includes a processor, memory, a communication subsystem, and can be configured to receive touch inputs, for example. The rower apparatus 206 is an exercise apparatus that is configured to engage with the user in order to exercise, for example by way of pull resistance by the user. The IO Board 204 is configured to provide logic and physical interface between the rower apparatus 206 and the tablet 202. In an example embodiment, the IO Board 204 is a circuit board with suitable pins, connectors, and/or circuit traces.

Figure 3:
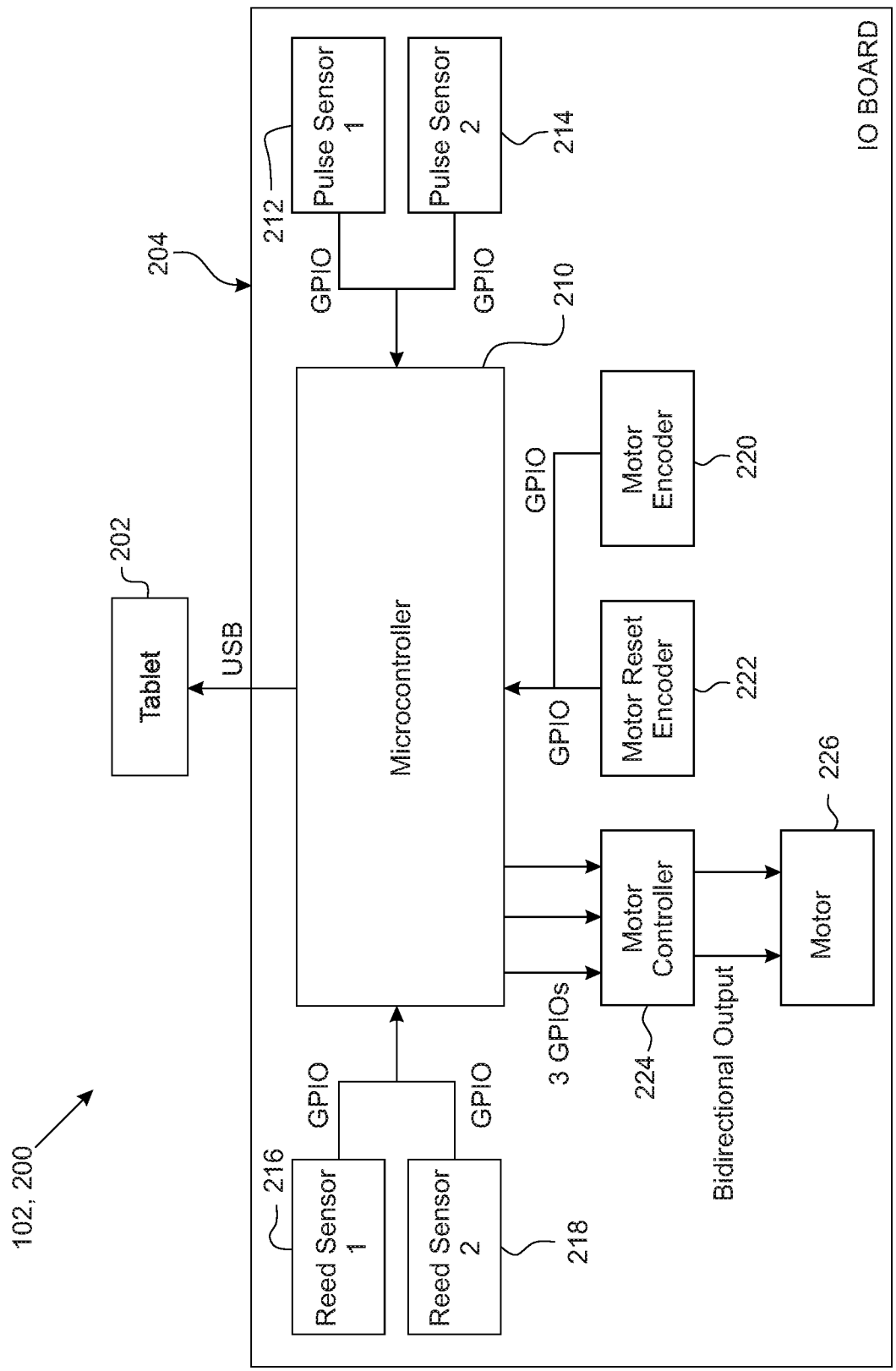
FIG. 3 illustrates a detailed block diagram of logic components of the exercise device of FIG. 2, in accordance with an example embodiment.

FIG. 3 illustrates a detailed block diagram of logic components of the exercise device 102, e.g., rower 200, in accordance with an example embodiment. The IO Board 204 includes at least one processor such as a microcontroller 210 configured for performing processing functions. The IO Board 204 also includes modules for a first pulse sensor 212 and a second pulse sensor 214, that are configured for detecting pulse rate of the user. The IO Board 204 also includes modules for first reed sensor 216 and second reed sensor 218, that are configured for detecting speed, e.g. rotation speed, of operation of the rower apparatus 206. A motor 226 controls an adjustable resistance of the rower apparatus 206. Additional modules include motor encoder 220 and motor reset encoder 222, for the motor 226. A motor controller 224 is used to control the motor 226.

The microcontroller 210 can be configured to communicate with the tablet 202 over a single interface such as USB interface. The USB interface can also be used to provide power to the tablet 202. The microcontroller 210 includes connections to the other modules using General Purpose Input Outputs (GPIO) connectors or pins.

Figure 4:
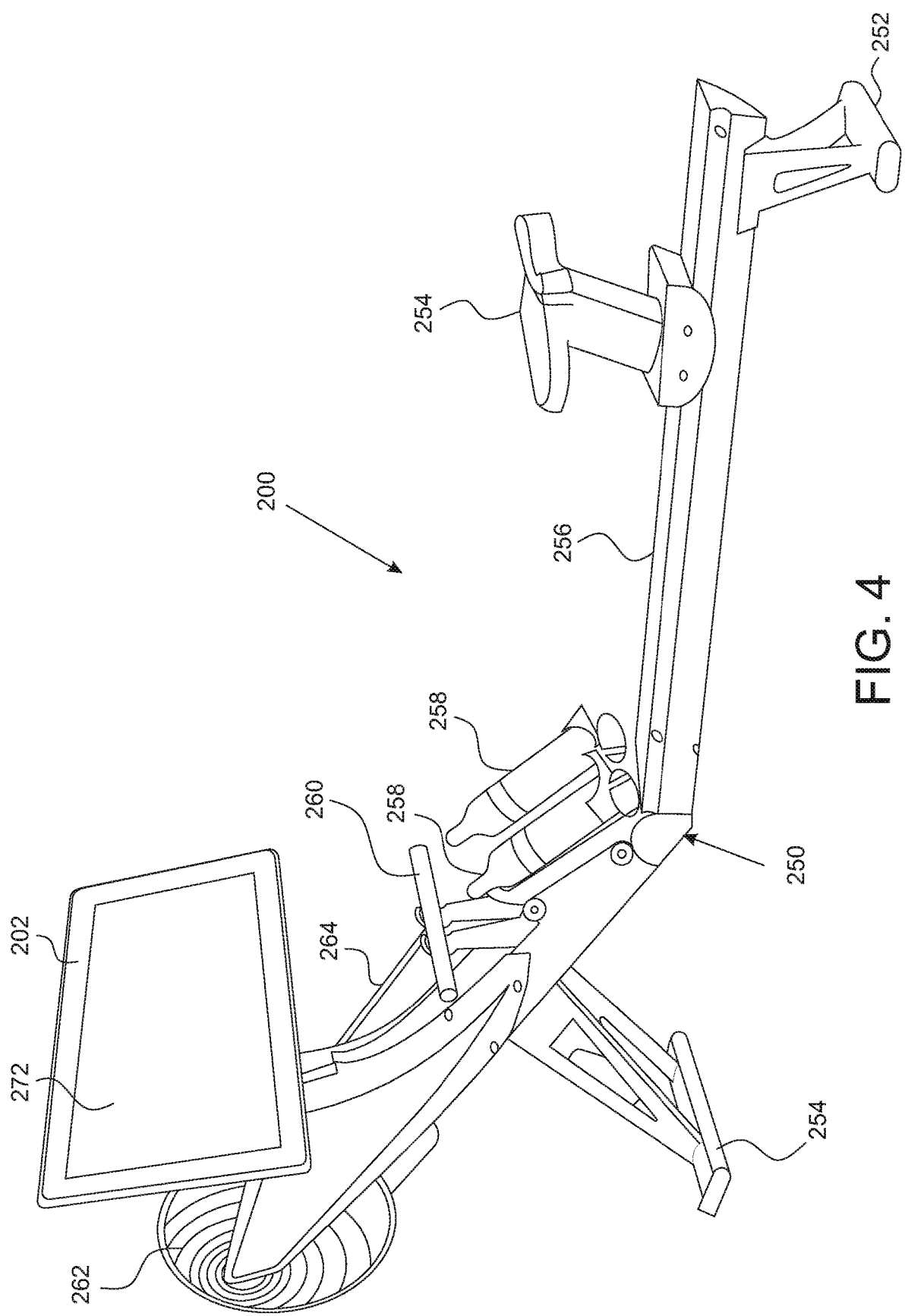
FIG. 4 illustrates a perspective view of the exercise device of FIG. 2, in accordance with an example embodiment.

FIG. 4 illustrates a perspective view of the rower 200, in accordance with an example embodiment. The rower 200 includes a frame 250 for supporting components of the rower apparatus 206. The rower 200 includes feet 252 that are 4-way adjustable in height, a seat 254 that is slideable along a track 256, two footrests 258, a handlebar 260, a flywheel 262, and a cable 264.

Figure 5:
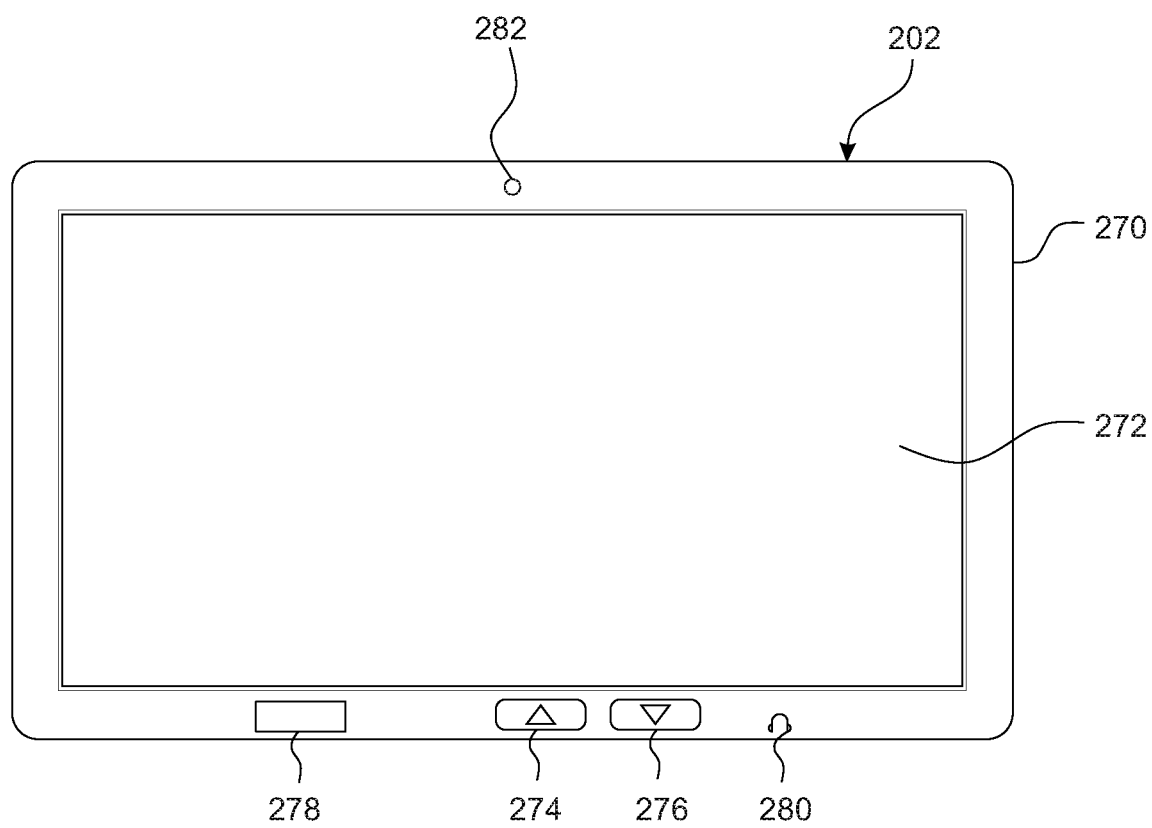
FIG. 5 illustrates a front view of a tablet of the exercise device of FIG. 2, in accordance with an example embodiment.

FIG. 5 illustrates a detail front view of the tablet 202, in accordance with an example embodiment. The tablet 202 includes a casing 270 that houses the components of the tablet 202. The tablet 202 includes a touchscreen 272 that is configured to be both a display screen (e.g. to display graphical user interfaces) and as a user input device (e.g. to receive touch inputs). Up button 274 and down button 276 are attached to the casing and are configured as user input devices. The commands that result from the buttons can be dedicated commands. In an example embodiment, the buttons 274, 276 can be programmed as soft buttons that depend on the context of the particular graphical interface. In an example embodiment, a trainer or leader of a group of the exercise devices 102 can increase, or decrease, the same adjustment of resistance to all members of the group using the up button 274, or the down button 276, respectively. In an individual mode of operation for individual use of one exercise device 102, the up button 274, or the down button 276, can be used to increase, or decrease, the same differential change of difficulty or resistance to the exercise device 102, respectively. Selection of the up button 274 or down button 276 also causes the same resistance change to the trainer's own exercise device 102.

In an example embodiment, an infrared (IR) receiver 278 is configured as a user input device, to receive commands from a remote control (not shown). In some example embodiments, the IR receiver 278 can be configured to input commands similar to the up button 274 and the down button 276, or other commands. In an example embodiment, the remote control (not shown) can be a dedicated remote control device, a mobile communication device, a mobile phone, or buttons attached to the handlebar 260 (FIG. 4). In an example embodiment, the tablet 202 can also include audio output device such as headphone jack 280, a speaker on the rear side of the tablet 202 (not shown), and/or short-range wireless subsystem such as Bluetooth™ or ANT (not shown) for audio output to a communication device.

Referring still to FIG. 5, in an example embodiment, the communication subsystem of the tablet 202 can be configured to communicate via wireless and/or wired communication, The communication subsystem can be configured to communicate over one or more networks, such as the WAN 106, the Internet, the World Wide Web, metropolitan area network (MAN), an intranet, a local area network (LAN) and/or a wireless LAN (WLAN). In an example embodiment, the tablet 202 can include an Ethernet port (not shown) for the wired communication. In example embodiments, the communication subsystem can communicate using WIFI that supports IEEE 802.11 2.4+5 GB a/b/g/n/ac, SDIO+UART interface, as understood in the art, for example.

The tablet 202 can be configured to send or receive commands over the communication subsystem to the networks to the cloud central server 104. For example, pressing of the button 274, 276 results in the exercise device 102 increasing or decreasing its relative resistance from its current resistance level, and can also send a message over the network to the cloud central server 104 to command other specified exercise devices to also adjust (increase or decrease) their resistance by the same differential change. The same adjustment or same differential change can be measured in units or levels as defined by the particular exercise device 102. In an example embodiment, the tablet 202 can also receive commands directly from the cloud central server 104 acting as an AI decision maker, or indirectly from one of the other exercise devices 102 via the cloud central server 104. In response to the command, the exercise device 102 adjusts (increase or decrease) its resistance by a specified differential change.

In an example embodiment, the tablet 202 includes a front-facing camera 282. The camera 282 can be configured for capturing the expressions of the user of the particular tablet 202. The camera 282 can be configured for capturing gesture-based input commands in an example embodiment. In an example embodiment, the tablet 202 includes a microphone (not shown). The microphone can be used for capturing audio of the user of the particular tablet 202. The microphone can be used for capturing voice-based input commands in an example embodiment.

Referring to FIG. 4, in another example embodiment, the handlebar 260 itself can include buttons (not shown) that are controlled by the user for user input, for example, one thumb button on the right handlebar is designated as an up button and another thumb button on the left handlebar is designated as a down button (or vice versa in another example embodiment). These buttons may be configured to perform the functionality described with respect to the up button 274 and the down button 276 (FIG. 5). In some example embodiments, further example electro-mechanical input devices include buttons, switches, toggles, dials, sliders, etc. In some example embodiments, gesture based inputs may be used, for example using the camera 282 or an inertial sensor.

Referring to FIG. 5, in an example embodiment, the tablet 202 can be loaded with an Android™ operating system, and loaded with an Android™ application or other dedicated application. Accordingly, in an example embodiment, some data for operation of the exercise device 102 can be stored in memory of the tablet 202, while other data is received from the cloud central server 104 when in operation, such as speed or performance of other exercise devices 102 during a shared virtual exercise session.

Example graphical interface screens of the tablet 202 include: "First Start", when the tablet 202 is powered on for the first time, this is the setup and configuration steps; "Main Menu", after completing setup, and after tablet 202 is powered on; "Sign Up", register a new user; "Invite" folder, invite others to a challenge the user is hosting; "Notifications", e.g. friend request, invitation to participate in a challenge; "HUD", heads up display, in challenge metrics; "Result", post challenge menu that summarizes all metrics; "User Profile", complete history of all workouts; and "Settings". In other example embodiments, more or less graphical interface screens may be used.

Referring again to FIG. 1, the cloud central server 104 will be described in greater detail, in accordance with an example embodiment. A cloud hosted application in the cloud central server 104 controls all communication between the tablets 202 of all of the exercise devices 102 (e.g. notifications, updates, real-time game/challenge data). The cloud hosted application stores all hardware data (e.g. sensor, encoder, resistance). The cloud hosted application stores all software data (e.g. user profiles, user metrics, subscriptions). The cloud hosted application allows access and changes to information stored in the database via web application (e.g. customer portal and staff/administrator portal), accessible by way of example devices such as personal mobile phone 108, personal computer 110, and personal tablet 112. The cloud hosted application is hosted by Google™ in an example embodiment, and can be hosted by any cloud platform in other example embodiments.

In an example embodiment, users can access the customer portal of the cloud central server 104 to manage their equipment and subscription online via the web. In an example embodiment, the staff/administrator portal is a web portal that gives an administrative team access and control of all database information. In example embodiments, the main tabs can include, for example: Coupon Manager; Key Manager; Account Manager; Machine Manager; Equipment; Administrator.

Figure 6:
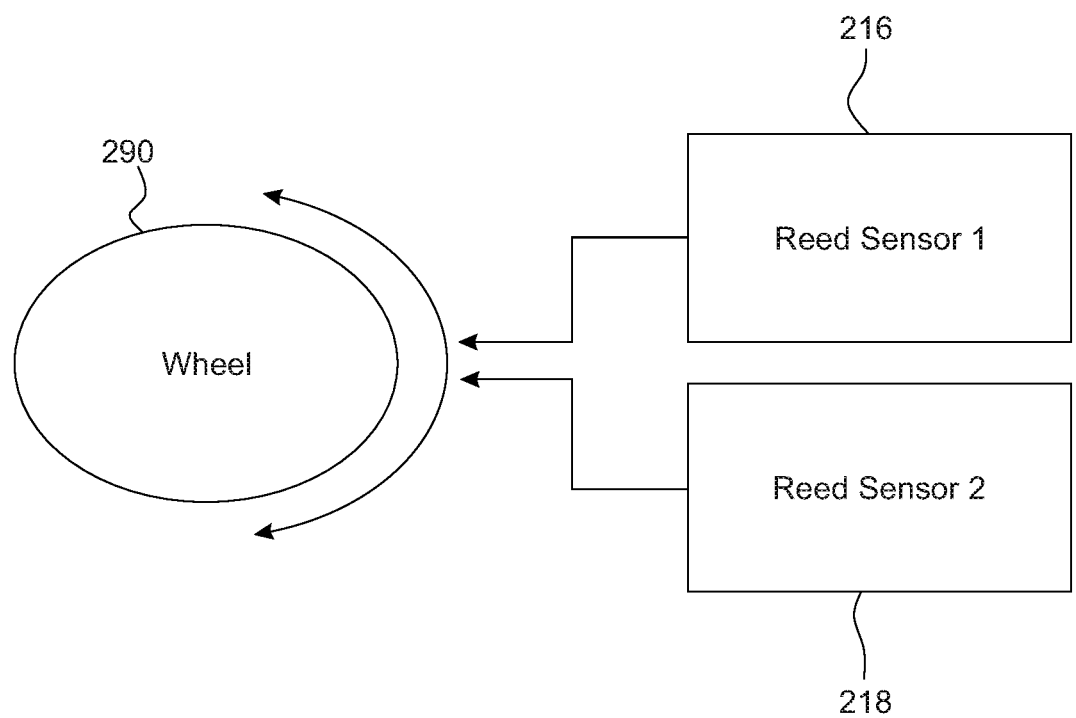
FIG. 6 illustrates a detailed block diagram of sensing components of the exercise device of FIG. 2, in accordance with an example embodiment.

FIG. 6 illustrates a detailed block diagram of sensing components of the rower 200, in accordance with an example embodiment. The flywheel 262 (FIG. 4) includes a wheel 290 that rotates in response to pulling of the handlebar 260 by the user. The first reed sensor 216 and the second reed sensor 218 are positioned and configured to detect speed, e.g. rotation speed, of the wheel 290. As understood in the art, when a reed sensor 216, 218 is exposed to a magnetic field, two ferrous materials inside a switch pull together and therefore the switch is activated and/or a signal is generated in response.

Figure 7:
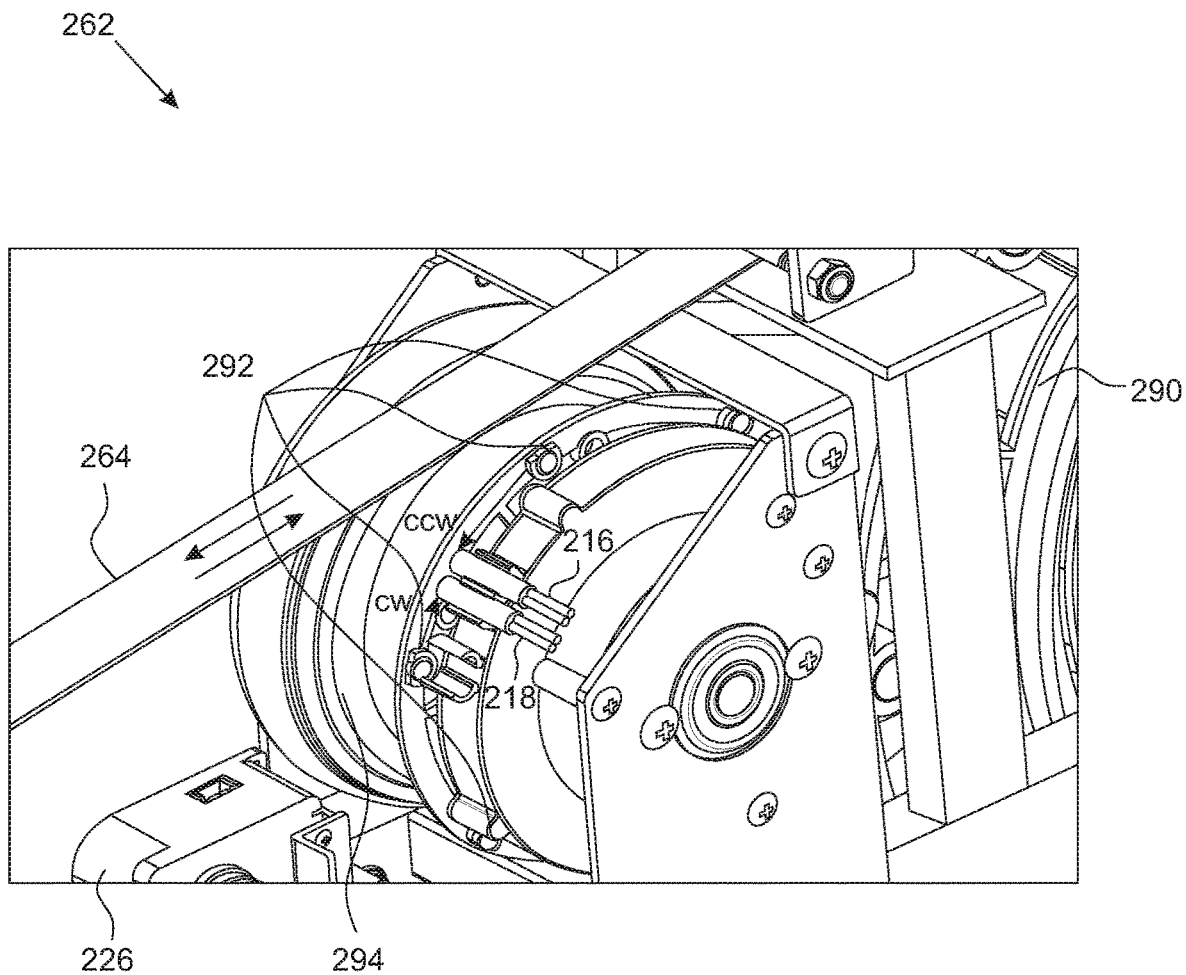
FIG. 7 illustrates a perspective detail view of a flywheel of the exercise device of FIG. 2, in accordance with an example embodiment.

FIG. 7 illustrates a perspective detail view of the flywheel 262 of the rower 200, in accordance with an example embodiment. The flywheel 262 includes baffles or vanes that further provide air resistance when rotating. A plurality of magnets 292, e.g. six magnets 292 in this example, are mounted to a rotor that is operably coupled to the wheel 290. The first reed sensor 216 and the second reed sensor 218 are positioned and configured to detect rotation speed of the rotor 294, and therefore the rotation speed of the wheel 290.

The reed sensors 216, 218 are used to count the rotation of the wheel 290 (for flywheel 262). The rotation of the flywheel 262 is used to determine virtual or effective distance traveled; that is then used to calculate various other metrics such as performance, speed, exercise power, calories burned, etc. These reed sensors 216, 218 are operably connected to two GPIO pins on the IO Board 204 (e.g. one for each pin). In an example embodiment, there are two reed sensors instead of one sensor because the flywheel 262 rotates in both directions. The user pulls the cable 264 away from the flywheel 262 which rotates the flywheel clockwise. This triggers first reed sensor 216, then second reed sensor 218, then first reed sensor 216, etc. This indicates that the user's virtual distance is increasing. When the user releases the cable 264 back towards the flywheel 262, the flywheel 262 rotates counter-clockwise. This triggers the same first reed sensor 216 to trigger twice (two times), indicating that the user is no longer increasing distance.

Figure 8:
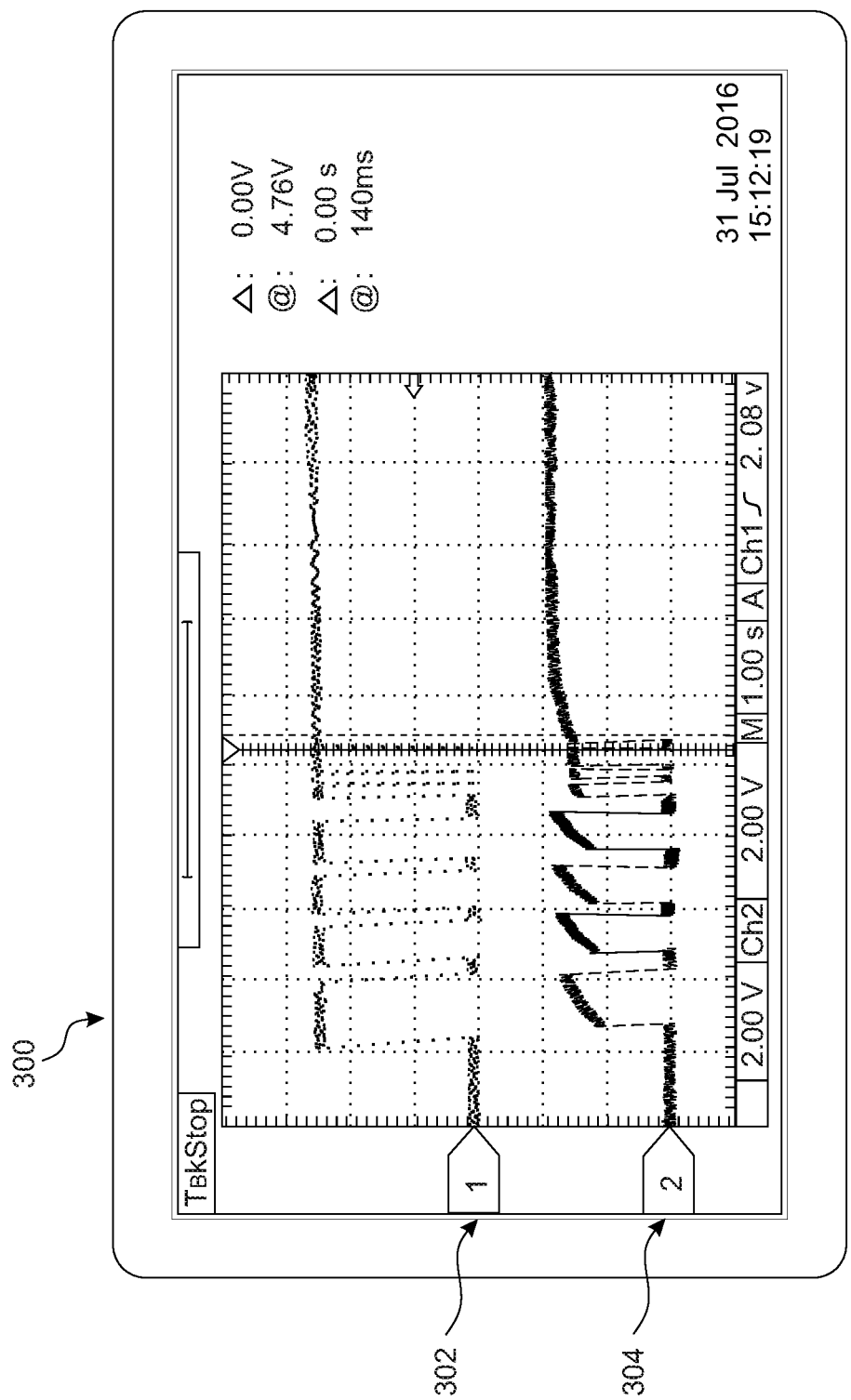
FIG. 8 illustrates a graph of results taken from the sensors near the flywheel of FIG. 7, in accordance with an example embodiment.

FIG. 8 illustrates a graph 300 of results taken from the reed sensors 216, 218, in accordance with an example embodiment. The graph 300 represents voltage versus time. The first plot 302 represents readings taken from the first reed sensor 216, and the second plot graph 304 represents readings take from the second reed sensor 218. These are oscilloscope measurements that illustrate how the reed sensors 216, 218 are leading/lagging each other.

Figure 9:
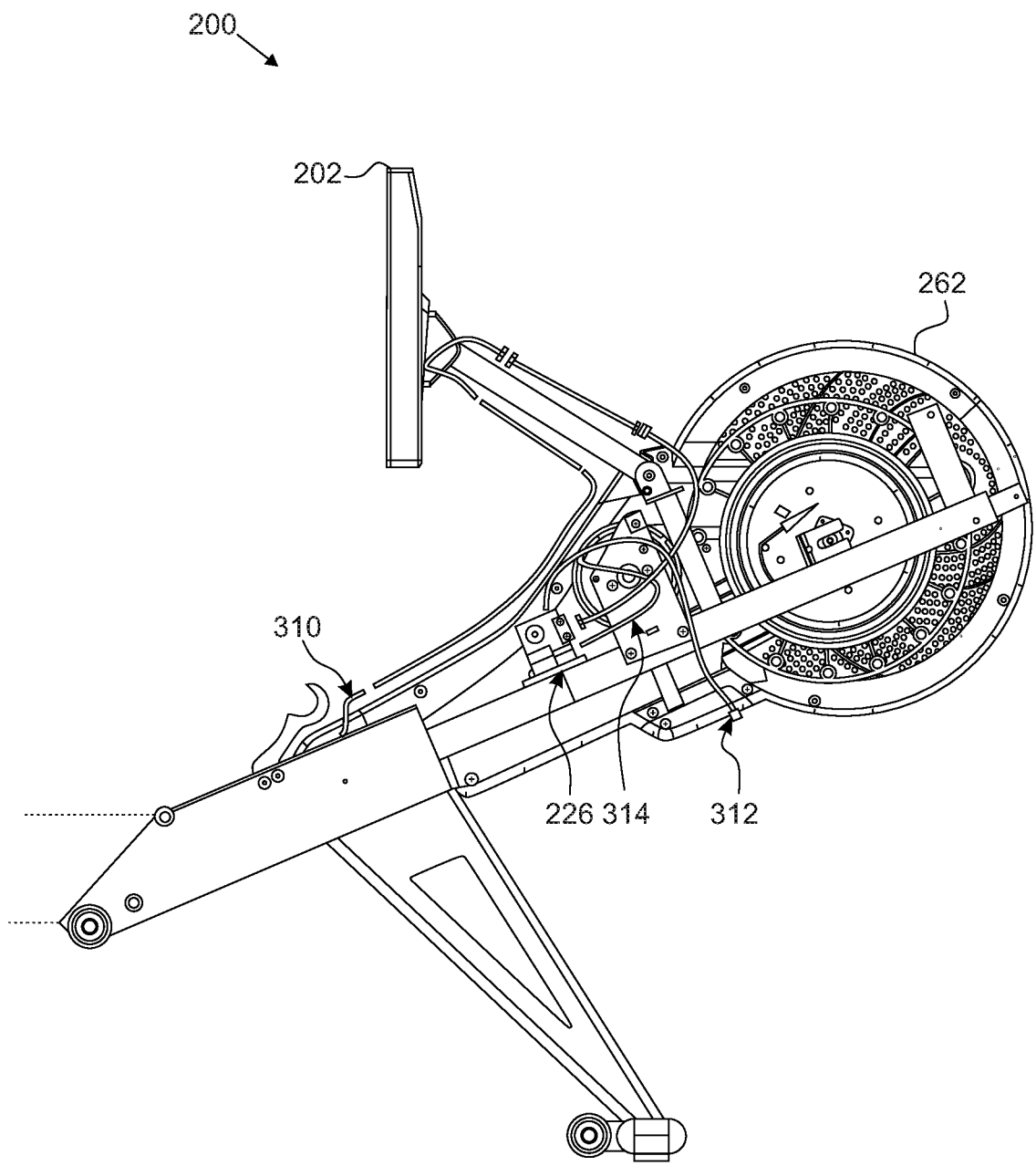
FIG. 9 illustrates a partial side diagrammatic view of a wiring diagram of the exercise device of FIG. 2, in accordance with an example embodiment.

FIG. 9 illustrates a partial side diagrammatic view of a wiring diagram of the rower 200, in accordance with an example embodiment. The rower 200 further includes a wireless heart rate receiver 310 operably coupled to receive data from heart rate sensors (not shown) that can be already provided on the rower apparatus 206. In some example embodiments, the pulse sensors 212, 214 can be located on the handlebar 260, or a separate device such as earphones, smart watch, wristband, gloves, smart eyeglasses, wearable chest strap, etc. The rower 200 further includes the motor 226, external power 312 for the motor 226, and sensor(s) 314 (illustrated as a sensor lead wire) for the motor controller 224.

Referring to FIGS. 8 and 9, operation of the adjustable resistance using the motor controller 224 will be described in greater detail, in accordance with an example embodiment. The motor 226 is connected to a wire or other connector that is used to move magnets closer to or further away from the flywheel 262 (details not specifically shown). Moving the magnets closer using the motor 226 increases the force required to move the flywheel 262. Moving the magnets away using the motor 226 decreases the force required to move the flywheel 262. This effectively makes it more difficult for the user which in turn will affect the performance metrics (e.g. distance traveled, calories burned, etc.) for the user of the exercise device 102.

In an example embodiment, the motor controller 224 comprises an H-bridge Integrated Circuit (IC) controller via three GPIO contacts to the microcontroller 210 (FIG. 3). The H-bridge IC controller is connected to a DC motor, in an example embodiment. The DC motor is used to increase and decrease resistance of the flywheel 262 by adjusting distance of the magnets from the flywheel 262. In an example embodiment, there are 16 levels of resistance. The specific number of levels and difficulty of the resistance can be defined by the particular exercise device 102 or its manufacturer, in an example embodiment. The DC motor rotates forwards, rotates backwards or is in standby operation. In an example embodiment, the microcontroller 210 sends HIGH/LOW signals via the three GPIO's to the H-bridge IC controller which determine the direction of rotation, per the following Table 1.

TABLE 1

| Input Signal | | | Output Driver | | |
|---|---|---|---|---|---|
| IN1 | IN2 | IN3 | O1 | O2 | Mode |
| H | L | L | H | L | Forward |
| L | H | L | L | H | Reverse |

The motor encoder 220 will now be described in greater detail. The microcontroller 210 connects to feedback sensors 314 for the motor encoder 220. The motor encoder 220 gives an accurate measurement of the DC motor's movement operations. Specifically, the motor encoder 220 provides the microcontroller 210 information related to the rotations made by the motor 226. If the user increases resistance by 1 unit (e.g., there are 1-16 levels), the motor 226 will rotate until the sensor 314 reads 32 LOW to HIGH (0V to 5V) transitions, at that point the microcontroller 210 is configured to stop the motor 226. If the user increases resistance by 2 units, the motor 226 will rotate until the sensor 314 reads 64 LOW to HIGH (0V to 5V) transitions.

The motor reset encoder 222 will be described in greater detail. When the exercise device 102 is powered off, the motor 226 can be at any resistance level (1-16) depending on the last user or setting. The specific resistance level may not be known. As a result, every time the exercise device 102 is powered on, it can be reset to resistance 1 for the current user (Resistance 16=highest tension position on motor. Resistance 1=low/little tension on motor).

A pin of the microcontroller 210 is connected to the sensor 314 that sends data in order for the microcontroller 210 to determine when the motor 226 it is at resistance position 1. When the exercise device 102 is powered on, if the sensor 314 detects HIGH (5V), the motor 226 will not move because it is already at resistance 1. If the sensor 314 detects LOW (0V), the motor 226 will begin to decrease from resistance X to 1. It will keep rotating (decreasing resistance) until the sensor 314 detects HIGH (5V). This indicates it has reached 1 resistance. At this point the microcontroller's 210 pin connection to an optocoupler is activated and pulls high onto the microcontroller's 210 GPIO for the motor reset encoder 222.

Figure 18:
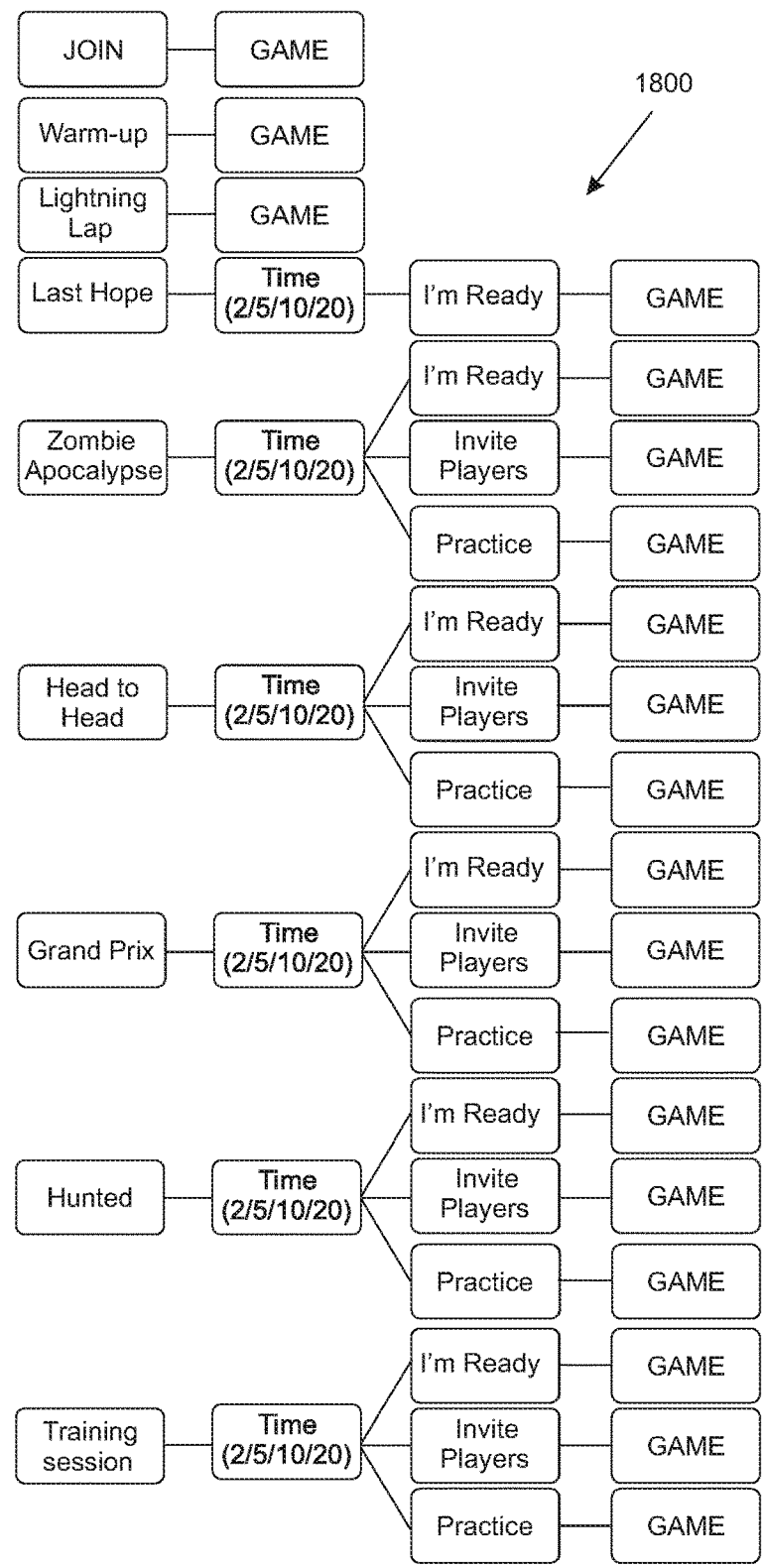
FIG. 18 illustrates a flow diagram of game selection graphical interfaces for one of the exercise devices of FIG. 1, in accordance with another example embodiment.

FIG. 18 illustrates a flow diagram 1800 of game selection graphical interfaces for one of the exercise devices 102, in accordance with another example embodiment. The flow diagram 1800 represents graphical interface screens for selection of a game. More or less options or games may be provided in example embodiments. Selection of a particular game results in a virtual exercise session for that exercise device 102, that is facilitated by the cloud central server 104. As can be seen in FIG. 18, in an example embodiment, traversal of no more than three graphical interface screens is required to select a particular game. Example selectable games of the flow diagram 1800 are illustrated in Table 2.

TABLE 2

| Title: | Summary: | Players |
|---|---|---|
| JOIN | Join waiting players | — |
| WARM-UP | Explore 4 beautiful hand-drawn worlds on a flying machine | 1 Player |
| LIGHTNING LAP | Challenge yourself to the fastest lap time | 1 Player |
| ZOMBIE APOCALYPSE | Work together with others as a team to outrun Zombies | At least 2 Players |
| HEAD TO HEAD | Push past the burn in an intense one on one race | 2 Players |
| GRAND PRIX | A highly competitive race with up to 10 players | At least 2 Players |
| LAST HOPE | Deliver the world's only known cure and avert a zombie epidemic | 1 Player |
| THE HUNTED | Wolves are after you and your family. Escape for your lives! | At least 2 Players |
| TRAINING SESSION | Train with a professional trainer (real or AI) | At least 2 Players |

The "Join" mode allows the user to join other(s) about to begin a game. It does so by directing the user to the "Meeting Room" where other(s) are already waiting.

In example embodiments, resistance adjustments of the exercise devices 102 can be performed remotely and in real time via electronically controlled resistance system to: Individual equipment (to 1); or Individual equipment part of group (to 1 of many); or Group of equipment can be adjusted simultaneously (to many). Resistance adjustments of the exercise devices 102 can be performed remotely; regardless of equipment location, for example. Exercise device 102 communication can be managed via the cloud central server 104. Decisions made by a processor of the cloud central server 104 are referred to herein as Artificial Intelligence (AI). In an example embodiment, resistance adjustments are performed remotely by:

1) Trainer (human);
2) User on another machine (human);
3) AI as trainer (Cloud Server);
4) AI as challenge (Cloud Server); and/or
5) Pre-set program (Cloud Server).

There are two main modes that can be accessed in the Main Menu: Non-Competitive and Competitive. In Non-Competitive mode, the user can play "Warm Up" and "Lightning Lap". Warm Up allows the user to row at their preferred pace and for an unlimited amount of time. Lightning Lap allows users to races against previous versions of themselves.

In Competitive mode, like the name describes, allows the user to compete against or collaborate with others on their exercise devices 102. There are winners and losers in competitive mode. There are two main styles of the competitive mode: Solo and Team. In Solo, the style of gameplay is individualized. The user competes alone or against others (e.g. 1 vs. 1, 1 vs. 9, 1 vs. AI). In Team, the style of gameplay is team based. The user competes with others (e.g. 5 vs. 5, 5 vs. AI).

The objective of every game is to achieve higher output (Kj) than your opponent(s). Games can be set with either a timed or output (Kj) parameter. Performance (virtual distance) of the avatars on the screen is measured by output (Kj) (energy) of the exercise device(s) 102. Virtual speed of the avatar(s) is based on exercise power (e.g. Watts) of the exercise device(s) 102.

A timed parameter restricts the length of the game to X as defined by the user. For example, users must achieve the highest output (Kj) as they can during X. The user that achieves the highest out wins. For example, X is 20 minutes. In a head to head race, the user who achieves the highest output (Kj) by the end of 20 minutes wins. An output (Kj) parameter restricts the length of the game to Y output (Kj) value as defined by the user. The user that achieves Y output first wins. For example, Y is 250 output (Kj). In a head to head race, the user who reaches 250 output (Kj) first wins. In an example embodiment, there are four Time Parameters: 2 minutes; 5 minutes; 10 minutes; 20 minutes. In an example embodiment, there are four Output Parameters: 100 output (Kj); 250 output (Kj); 500 output (Kj); 1000 output (Kj).

In an example embodiment, when playing a game where time parameter is set, when the time is over, the game ends for all players. However, when playing a game where output parameter is set, the game does not immediately end when a user reaches the output target. The game will end 30 seconds after the first users reaches the output target, or when all users reach the output target if it is under 30 seconds after the first users has reached the target. The purpose of this is so that users who are closely behind the winner can still finish the game and fairly compare their results against the winner.

Example 1: Head to Head Game with Two Players (Player 1 and 2) and Parameter 500 output (Kj). Player 1 wins by achieving 500 output (Kj) in 20:00 minutes. The game ends for player 1, but player 2 has not finished and has up to 30 seconds to reach 500 output (Kj). Let's say player 2 does NOT reach 500 calories at 20:30 minutes. The game is now completely over even though they did not reach the target.

Example 2: Head to Head Game with Two Players (Player 1 and 2) and Parameter 500 output. Player 1 wins by achieving 500 output in 20:00 minutes. The game ends for player 1, but player 2 has not finished and has up to 30 seconds to reach 500 output. Let's say player 2 reaches 500 output at 20:25 minutes. The game is now completely over. This allows player 1 and 2 to fairly compare each other's metrics.

Input Controls: there are two physical inputs on the rower 200 that control the game: 1. Sensor measuring the rotation of the flywheel 262; 2. Resistance. The sensor measuring the flywheel 262 determines how many revolutions the flywheel has made and the speed at which the flywheel 262 rotates. With this basic information, the processors can determine: a. Calories burned; b. Calories/Hour (Speed); c. Meters/30 minutes (Speed); d. Meters Traveled (Distance); e. Strokes/Minute; f Watts; g. Output (Kj)

To rotate the flywheel 262, the user must physically pull the rowing handlebar 260 towards them. The resistance is adjusted via the tablet 202 using the up button 274 and down button 276, or touchscreen icons, or other user input devices. This affects the flywheel 262 by increasing or decreasing the amount of force required to rotate the flywheel 262. A magnetic system controls the force. Increasing resistance will increase watts and output. Decreasing resistance will have the opposite effect.

Artificial Intelligent (AI) Players: AI players are computer generated players designed to mimic real players. AI players are used when there are not enough real players to play with or against. AI players mimic their real player counterparts and are generated only when there are not enough real users to play a game. When users are playing with or against AI players, they should not be able to tell it is an AI player, in an example embodiment. Players play with and against the AI, which needs to be challenging enough that it pushes the user(s) but not too challenging that they continuously fail.

AI's that are generated, are benchmarked against the real players they play against. For example, in a Head to Head game between a user and the AI, if the user is very strong and fast, then the AI will be very strong and fast as well. An AI's baseline metrics is calculated based on the historical and real-time metrics of users it is playing with or against.

An example step by step method on when and how AI is generated is as follows.

Step 1: Calculate Number of AI Required

The user(s) never waits more than 45 seconds for a game to begin. If a user has waited 45 seconds in "match making" and not enough users are found, then AI players are generated.

Example 1, a user playing head to head with parameter 5 minutes. The user has waited 45 seconds and no other user is available to play. AI generated to play with the user.

Example 2, a user playing group race (1 vs 9) with parameter 5 minutes. The user has waited 45 seconds and only 5 additional players founds. This game requires total 10 players (1+9) and only 6 players found (user+5 players). Therefore, 4 AI players generated.

Step 2: Calculate Baseline Metric

Every real user has a baseline benchmark, that is used to calculate the AI baseline metrics. Real user baseline benchmark is calculated by averaging the average watts (speed and power) of their last 2 games with similar parameters (see below Table 3).

TABLE 3

| Group | Parameter |
| --- | --- |
| Group A | 2 minutes, 5 minutes, 100 output and 250 output |
| Group B | 10 minutes and 500 output |
| Group C | 20 minutes and 1000 output |

For example, if the user is looking to play a game with parameter 5 minutes (Group A), the baseline benchmark will be created on the last 2 games played that had parameters of 2 minutes, 5 minutes, 100 output or 250 output (Group A).

For example, the user's previous game played (game #A) had a 5 minutes parameter and they had an average watts of 800. The next previous game (game #B) had a 250 output parameter and they had an average watts of 600. The next previous game (game #C) had a 100 output parameter and had an average watts of 700. The next previous game (game

D) had a 100 output parameter and had an average watts of 300. Therefore, the users baseline benchmark is 750 watts by averaging game 1 and 3. The AI does not consider game #B with 250 output parameter because it is not similar, it must be Group A, not B or C. The AI does not consider game #D because we only look at their last 2 games with similar parameters.

Step 3: Calculate which AI Needs to be Generated

If one AI is required, the AI will use the baseline benchmark of the user with the highest baseline benchmark. It will also mimic the user (explained in step 4).

If two AI is required, the first AI will use the baseline benchmark of the user with the highest baseline benchmark. The second AI will use the baseline benchmark of the user with the lowest baseline benchmark.

If three AI is required, the first AI will use the baseline benchmark of the user with the highest baseline benchmark. The second AI will use the baseline benchmark of the user with the lowest baseline benchmark. The third AI will use the baseline benchmark of the user with the 2nd highest baseline benchmark, etc.

Example 1, head to head game, 1 real user vs. 1 AI, shown in Table 4.

TABLE 4

| USER | BASELINE BENCHMARK | AI BASELINE BENCHMARK |
| --- | --- | --- |
| REAL USER #1 | 800 WATTS | |
| AI #1 | | 800 WATTS |

Example 2, Group Race (1 vs. 9), 6 real user vs. 4 AI, shown in Table 5.

TABLE 5

| USER | BASELINE BENCHMARK | AI BASELINE BENCHMARK |
| --- | --- | --- |
| REAL USER #1 | 800 WATTS | |
| REAL USER #2 | 400 WATTS | |
| REAL USER #3 | 300 WATTS | |
| REAL USER #4 | 750 WATTS | |
| REAL USER #5 | 600 WATTS | |
| REAL USER #6 | 900 WATTS | |
| AI #1 | | 900 WATTS |
| AI #2 | | 300 WATTS |
| AI #3 | | 800 WATTS |
| AI #4 | | 400 WATTS |

Step 4: Calculate AI Real-Time Metrics

When a game begins, the AI will mimic the real user. The AI live metrics is a combination between user's live metrics and the baseline benchmark (step 3).

Example 1, shown in Table 6:

TABLE 6

| User | BASELINE BENCHMARK | AI BASELINE BENCHMARK |
| --- | --- | --- |
| REAL USER #1 | 800 WATTS | |
| REAL USER #2 | 400 WATTS | |
| REAL USER #3 | 300 WATTS | |
| REAL USER #4 | 750 WATTS | |
| REAL USER #5 | 600 WATTS | |
| REAL USER #6 | 900 WATTS | |
| AI #1 | | 900 WATTS |
| AI #2 | | 300 WATTS |
| AI #3 | | 800 WATTS |
| AI #4 | | 400 WATTS |

Using Real User #1 as example, Real User #1 baseline benchmark=AI #1 baseline benchmark (900 watts). Presume the game (virtual session) is 20 minutes.

The AI uses the user's live/real-time average watts+AI baseline benchmark (average watts)/2=AI live/real-time average watts. The AI checks the user's live/real time game metrics every 2 seconds and adjust its own metrics accordingly.

For example, at time 2 minutes, AI #1 baseline benchmark=800 watts. At time 2, user's live/real-metric=584 watts. At time 2, AI #1 live/real-time metric=692 watts ((800+584)/2).

Consider when it is a user's first time playing, and they do not have any history to calculate baseline benchmark. In these cases, the application will use random historical user data from previous games.

Example 1, User is going to play game with parameters 5 minutes. The user has never played a game with similar parameters before (Group A). The application will randomly select user data from two historical games where the parameter was also 5 minutes.

Example 2, User is going to play game with parameters 20 minutes. The user has played only one game with similar parameters (Group B) and the average watts was 700. The application will randomly select user data from one historical game where the parameter was also 20 minutes. In this example, the application finds a game where user had average watts of 500. Therefore, the user's baseline benchmark=600 average watts (700+500/2=600).

Consider when a user finishes the game slower than the AI. For example, the user's average watts is less than the AI average watts in the game, e.g. the user loses. In these cases, the user's baseline benchmark will decrease by e.g. 50 average watts. Specifically, their last game with similar parameters will decrease by 100 average watts.

For example, user has baseline benchmark of 1000 average watts (Game #A had a baseline benchmark of 900 and Game #B has a baseline benchmark of 1100). The user plays against AI and loses (achieves lower output). The user's NEW baseline benchmark is now 950 average watts (Game #A has a baseline benchmark of 900 watts minus 100; therefore Game #A baseline benchmark is 800 and Game #B baseline benchmark is 1100).

In an example embodiment, the games are 2D endless runners and use parallax effect.

Warm-up game allows the user to warm up by rowing at their preferred pace for as long as they desire. They cannot lose, they cannot win, they can row for 1 minute, they can row for 5 hours, then can use 0 resistance or level 16 resistance; there are no particular rules or restrictions. Warm up is a side-scrolling game. The user will control a flying object in the center of the screen.

In warm-up, the avatar/object will travel left to right depending on the average watts of the user. Visually, the object will not move much, only slightly from left to right across the screen. The background will do the majority of the moving. The object will move closer to the left side of the screen when achieving higher average watts. When it is achieving lower watts, it will move closer to the center of the screen. Also, in an example embodiment, the object will travel up and down on the screen depending on the stroke rate. The higher the stroke rate, the higher the object will fly upwards on the screen. If the user does not move (average strokes per minute (SPM)=0), the object will sit at the bottom of the screen.

Head to Head: "Race One on One". The head to head race is between two (2) players. The two players compete against one another, 1 vs. 1. There is always a winner and always a loser. The game algorithm optimizes and matches players that have similar metrics (e.g., similar baseline benchmark-average watts) so that the game is balanced.

Grand Prix: "You and up to 9 Others". The group race is played with at least 2 (two) players. The user competes against at least 1 other player—e.g. 1 vs. 9. There is always a winner. The game algorithm optimizes and matches players that have similar metrics (similar baseline benchmark-average watts) so that the game is balanced.

Group race is almost identical to head to head. It shares many of the same features such as gameplay and graphics. The main difference is the number of tracks each user's avatar travels along. Because group race game can have more than 2 players, there are more than 2 tracks (e.g. 10 tracks).

Escape Games: Zombie Apocalypse, Last Hope and Hunted are variations of the same game, in an example embodiment. They all have similar game dynamics, goals, etc. The difference is the graphics and number of players. This group of games can be referred to as "Escape" games. In an example embodiment of the games, the system displays on the graphical interface an animation that chases a representation of the exercise devices. When the animation reaches the representation on the graphical interface, this ends at least part of the shared virtual exercise session for at least one of the exercise devices. Because each respective user of each respective exercise device can have a respective baseline performance target, the animation can be programmed to have a virtual speed that is dependent on all respective baseline performance targets. In an example embodiment, the virtual speed is calculated by the cloud central server 104, and can be re-calculated during the game in real-time.

Escape games can have the same parameters as head to head: 1. Time Parameters (2, 5, 10 and 20 minutes); 2. Output Parameters (100, 250, 500 and 1000 output). Escape games can be played as either: 1. Solo Competition—one player vs. AI (e.g. Last Hope); 2. Team Competition—up to five players (working together and represented as 1 object) vs. AI (e.g. Zombie Apocalypse); 3. Group Competition—up to five players (working separately and each represented as their own object) vs. AI (e.g. Hunted).

The goal of escape games is to maintain greater output (Kj) value than the AI.

In Zombie Apocalypse, the players (at least 2) are represented by a single horse and wagon, trying to run from killer zombies (AI). The players work together as a single object. If the zombies catch the wagon, causing it to flip over and killing all players, it will end the game for all players. If they reach the game parameter (e.g. 5 minutes or 250 output) before the zombies catch them, they will make it to safety, winning and ending the game.

In Last Hope, the player (1 player) is represented by a character, trying to run from killer zombies (AI). If the zombies catch the character killing the player, it will end the game. If the player reaches the game parameter (e.g. 5 minutes or 250 output) before the zombies catch them, they will make it to safety, winning and ending the game.

In Hunted, the players (at least 2) are each represented by characters, trying to run from wolves (AI). The players work independently for one another. If the wolves catch a character killing the player, it will end the game only for that player. If any player(s) reach the game parameter (e.g. 5 minutes or 250 output) before the wolves catch them, they will make it to safety, winning and ending the game.

The Escape games AI's live watts are calculated the same way as previously mentioned, using a combination of the player(s) baseline benchmark and live watts plus 3%. Specifically, AI's live watts=((user's live average watts+user's baseline benchmark])/2) multiply by 1.03.

Example 1: Solo competition (e.g. Last Hope)=1 player vs. AI. The player's baseline is 500 average watts. Therefore, the AI's baseline benchmark is 500. During the game, if user's live average watts is 600, then AI's live watts is 566.5 [((600+500)/2)*1.03]. During the game, if user's live average watts is 400, then computers live watts is 463.5 ((400+500)/2)*1.03.

Example 2: Team competition (e.g. Zombie Apocalypse)=5 players vs. AI. The total of 5 players' baseline is 2500 average watts. Therefore, the M's baseline benchmark is 2500. During the game, if the players combined average watts is 2000, then the AI's live watts is 2317.5 [((2500+2000)/2)*1.03]. During the game, if the players combined average watts is 3000, then the AI's live watts is 2832.5 [((2500+3000)/2)*1.03].

Example 3—Group competition (e.g. Hunted)=(3 players+2 AI players) vs. AI. There are only 3 real players; therefore, the application will generate 2 AI players to play with the 3 real players. Real players and AI's baseline benchmark (Step 3 from AI):

| USER | BASELINE BENCHMARK | AI BASELINE BENCHMARK |
|---|---|---|
| REAL USER #1 | 500 WATTS | |
| REAL USER #2 | 700 WATTS | |
| REAL USER #3 | 400 WATTS | |
| AI #1 | | 700 WATTS |
| AI #2 | | 400 WATTS |

Therefore, the M's baseline benchmark is 2700. During the game, if the players and AI players combined live average watts is 3000, then the M's live watts is 2935.5 [((2700+3000)/2)*1.03].

When the game starts, the players have a predefined (e.g. 10 second) head start before the AI begins.

If the game parameter is time; and there are 180 seconds remaining, and the players are leading, the computer will get a boost between 1-500 average watts.

Specifically, the difference between players watts vs. AI watts multiplied by 20 up to a maximum of 500 is added to the M's watts.

For example: Game with 10 minutes time parameter. 180 seconds remaining in game. Players currently achieved 250 output and leading. AI currently achieved 240 output. Output difference between players and AI is 10. AI's average watts will increase by 200 (10 output×20). Therefore, if AI's live watts is 500 average watts, its new live watts will be 700 average watts (500+200).

Example: Game with 10 minutes time parameter. 180 seconds remaining in game. Players currently achieved 250 output and leading. AI currently achieved 200 output. Output difference between players and AI is 50. AI's average watts will increase by 500 (50 output×20=1000, but maximum is 500). Therefore, if AI's live metrics is 500 average watts, its new live metrics will be 1000 average watts (500+500).

Consider when a user loses the game and does not finish. In these cases, the user's baseline benchmark will decrease by 50 average watts. Specifically, their last game with similar parameters will decrease by 100 average watts.

For example, user has baseline benchmark of 1000 average watts (Game #A had a baseline benchmark of 900 and Game #B has a baseline benchmark of 1100). The user plays against AI and loses. The user's new baseline benchmark is now 950 average watts (Game #A has a baseline benchmark of 900 calories minus 100; therefore Game #A baseline benchmark is 800 and Game #B baseline benchmark is 1100).

In escape games, other elements can be involved. One of the below events will randomly occur every x-y minutes:

Boost Star: e.g., the player(s) find a special Boost Star that propels them forward automatically, giving them a 15 second break. It allows the players to rest while the Boost Star propels them at a constant average watts rate which is the same rate as the chasing AI.

Dense Fog: e.g. dense fog enters which slows the player(s) average watts by 15% for 15 seconds; the chasing AI continues at its current speed. The player(s) must achieve higher average watts so that the chasing AI does not catch up and kill them, ending the game.

Boss: e.g., a boss zombie or wolf AI enters the screen. If the player(s) do not boost their average watts by 15% within 5 seconds, the boss AI will kill them and they will die, ending the game.

Figure 10:
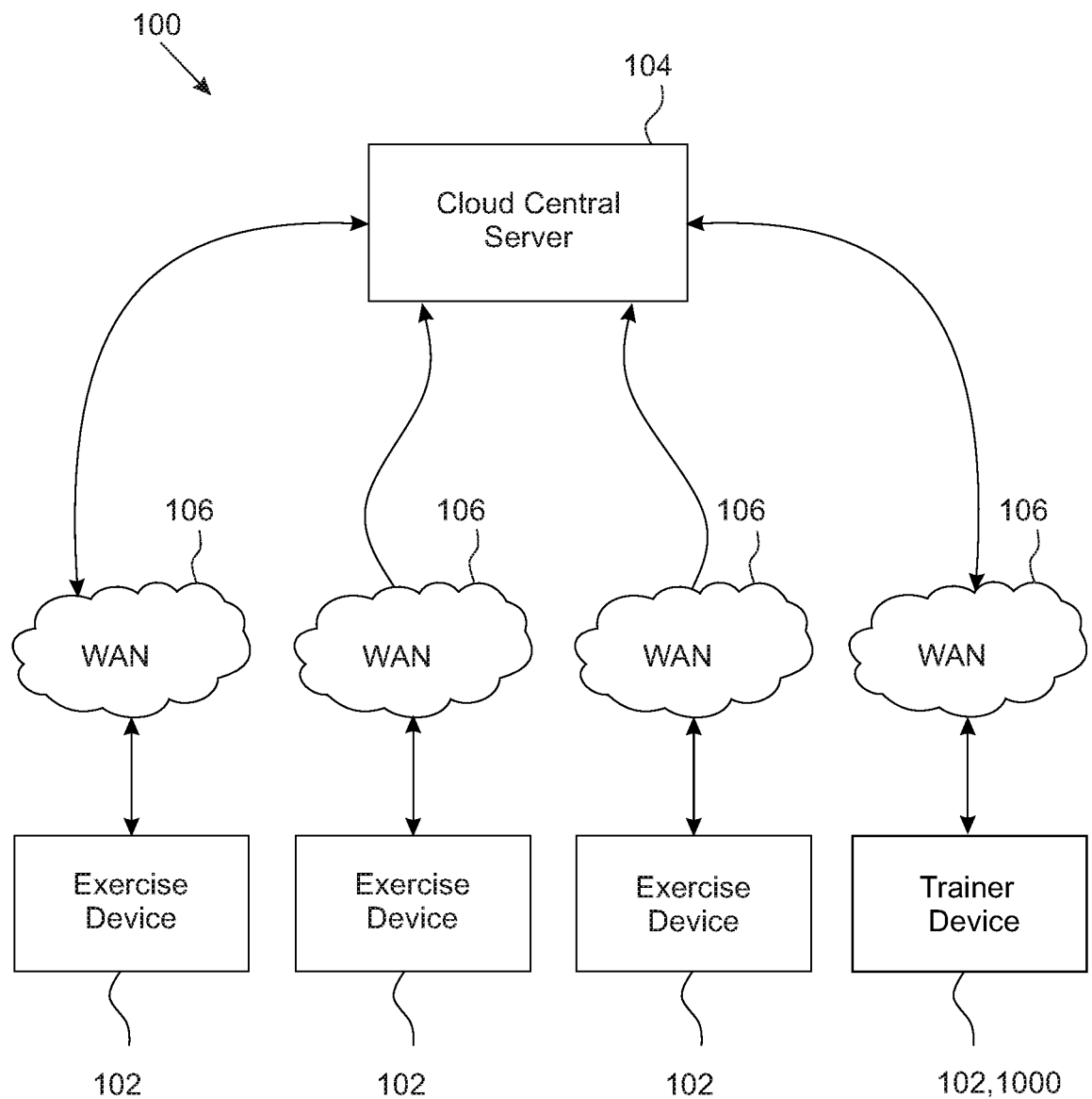
FIG. 10 illustrates a block diagram of an example implementation of the system of FIG. 1, having one exercise device designated as a trainer exercise device, in accordance with an example embodiment.

The "1) Trainer (human)" function, mentioned above, will now be described in greater detail. FIG. 10 illustrates a block diagram of an example implementation of the system 100, having one exercise device 102 designated as a trainer exercise device 1000, for a virtual training session in accordance with an example embodiment. The trainer exercise device 1000 is used by one of the users, who is designated as a "trainer" or "leader" of a group of users of the exercise devices 102. Training can be performed with a professional trainer, or one of the users who is designated as the trainer. The trainer can be appointed when a user reaches a historical performance threshold, or in other example embodiments can be self-proclaimed or third-party verified, such as via certification.

The trainer can control resistance setting of a single person or group of persons simultaneously. Trainer receives users metrics in real time and is displayed on his/her screen, e.g. current resistance, distance, watts, output (Kj), speed, strokes per minute (spm), rotations per minute (rpm), calories, pole position, etc. Two-way communication between trainer and users via camera 282 (displayed via touch screen 272) and microphone (heard via speakers or headphones 280).

Trainer can make resistance adjustments to users equipment in real time via: Touch screen; GPIO device (e.g. buttons 274, 276 at bottom of touch screen); Computer and keyboard. Resistance adjustments can be: Pushed to individual user (1 to 1 or 1 to 1/many); Broadcasted to multiple users (1 to many). Trainer can set metric targets such as heart rate, distance, spm, rpm, watts, output, etc.: to individual user (1 to 1 or 1 to 1/many); to multiple users (1 to many). In an example embodiment, the trainer pressing the GPIO device (e.g. buttons 274, 276 at bottom of touch screen) results in the trainer exercise device 1000 also causing the same differential adjustment in resistance to itself. In another example embodiment, the trainer pressing the GPIO device (e.g. buttons 274, 276 at bottom of touch screen) results in only the other exercise devices 102 (or specified group) causing the same differential adjustment in resistance, without the trainer exercise device 100 being specifically affected. In addition to communication with trainer, users can see other users: live video feed; metrics (including current resistance level and current exercise performance).

Figure 11:
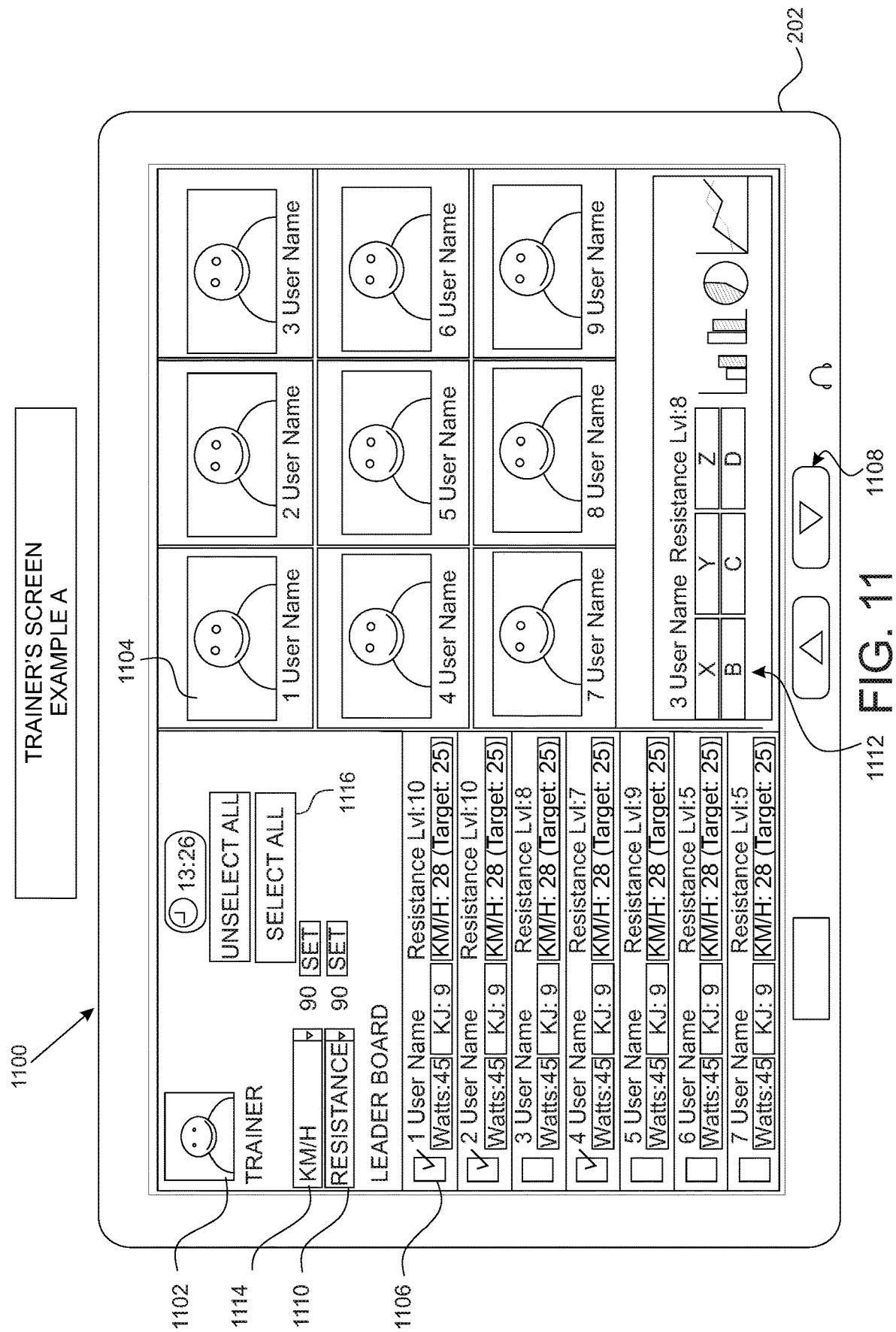
FIG. 11 illustrates an example graphical interface screen on the display screen of the trainer exercise device of FIG. 10, in accordance with an example embodiment.

FIG. 11 illustrates an example graphical interface screen 1100 on the tablet 202 of the trainer exercise device 1000 of FIG. 10, in accordance with an example embodiment. 1102 is video from front facing camera 282 so the trainer can see image of him/herself being streamed to users. 1104 is a live video of users. User metrics 1106 is user metrics and can be used to select individual users. Buttons 1108 is physical resistance adjustment control (e.g., using buttons 274, 276). Resistance adjustment control 1110 is resistance adjustment control using the touch screen. Resistance adjustment control 1110 displays to the trainer what level of resistance (e.g., mean, median or mode) the group of users are set at. The level of resistance displayed on resistance adjustment control 1110 is not reflective of everyone's resistance level since users start at a level based on their previous selected level or historical performance. It will display either mean, median or mode depending on configuration. In an example scenario, if a user's resistance baseline is +1 of the group, and the trainer increases the groups resistance from level 5 to 10, then user's resistance will increase to level 11 (+1 of the group).

User metrics 1112 is detailed user metrics of one of the users (User 3 in this example). 1114 is user targets control, that can be adjusted using the touch screen. User target matches what is shown on leaderboard. This can be adjusted to selected users or collectively, using select all 1116 or individual select users via user metrics 1106. The buttons 1108 adjust the level of resistance only after the resistance adjustment control 1110 is selected via the touch screen (because user targets 1114 could currently be selected, and buttons 1108 would be adjusting this target instead). After making the adjustment, the button "set" next to the resistance adjustment control 1110 is selected to push the changes to all exercise devices. The changes are only pushed to those selected on the leaderboard 1106

In an example embodiment, selection of the buttons 274, 276 on the trainer exercise device 1000 results in the same resistance adjustment being performed onto a specified group of the exercise devices 102. In an example embodiment, the specified group of the exercise devices 102 can be all of the exercise devices 102 including the trainer exercise device 1000. In an example embodiment, the specified group of the exercise devices 102 can be all of the exercise devices 102 excluding the trainer exercise device 1000. In an example embodiment, the specified group of the exercise devices 102 can be one, two or more of the exercise devices 102, which may or may not include the trainer exercise device 1000.

An example scenario will now be described, in accordance with an example embodiment. Ten users join a class hosted by trainer. Class length is 30 minutes. Before joining, users select their level of difficulty which determines their starting resistance level, or the baseline resistance of each user can be determined by the cloud central server 104 based on historic performance of each user.

Trainer guides the users through a warmup. 5 minutes at low resistance level (e.g. default or baseline resistance level). Trainer sets low target watts (e.g. 25) for all users. Trainer explains to users that they will then be performing a slow uphill climb for 5 minutes. Trainer increases all users resistance (e.g. +10) by selecting all users using the select all button 1116, then selecting resistance adjustment control 1110, and then by hitting the up button from buttons 1108. The trainer also sets low RPM target (e.g. 20) by selecting the target field 1114, changing it from watts to RPM and adjusting it by hitting the up/down button from buttons 1108. This also increases the trainer's own trainer exercise device 1000. One user is struggling to maintain RPM target. Trainer can see from metrics and streaming video that they are struggling. Trainer selects (checks) that user on the user metrics 1106. Trainer lowers this particular user's resistance (e.g. 2) by unchecking all users but this, selecting one of the buttons 1110, and then by hitting the down button using physical resistance adjustment control 1108. 1 user RPM is far above RPM target. Trainer communicates to user via video and audio to slow down. User says it's too easy. Trainer increases that user's resistance (e.g. +2) by checking only this user on the user metrics 1106, selecting resistance field adjustment control 1110, and then by hitting the up button using one of the buttons 1108.

After a 1 minute break, trainer explains to users that they will be performing a sprint for 1 minute, break for 1 minute, for a total of 5 repetitions. Resistance is set by the trainer to decrease (e.g. −5) and the target SPM during the 1 minute sprint intervals is set to 30. 1 user is tired and decides to manually lower resistance even further themselves. They are able to do so using the controls in front of them (e.g. user input device(s)).

Figure 12:
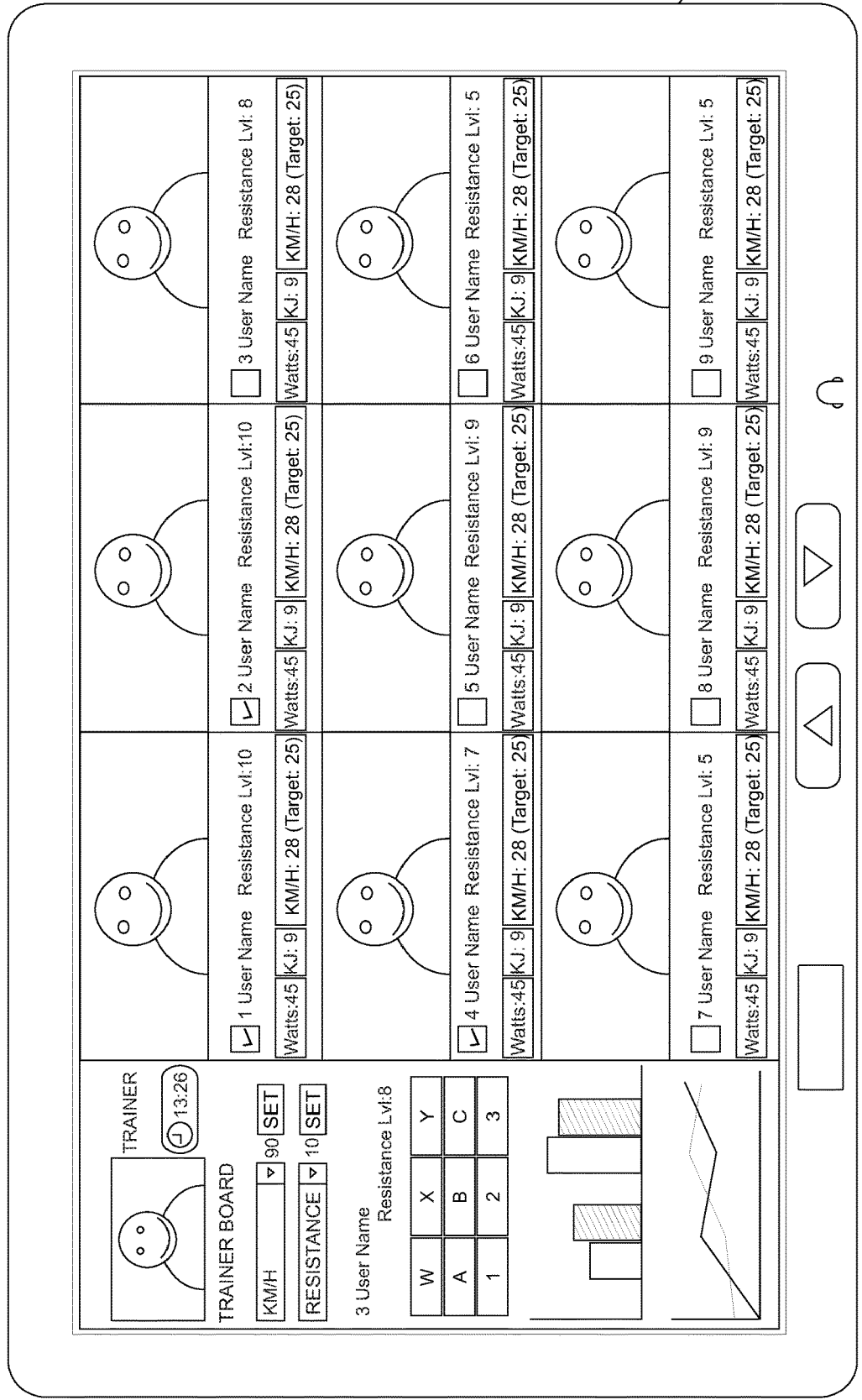
FIG. 12 illustrates another example graphical interface screen on the display screen of the trainer exercise device of FIG. 10, in accordance with another example embodiment.

FIG. 12 illustrates an alternate example graphical interface screen 1200 on the tablet 202 of the trainer exercise device 1000 of FIG. 10, in accordance with another example embodiment. The difference between this graphical interface screen 1200 and the previous graphical interface screen 1100 is that the user metrics 1106 are individually shown underneath each of the respective streaming videos of each user rather than collectively being in a separate window.

Figure 13:
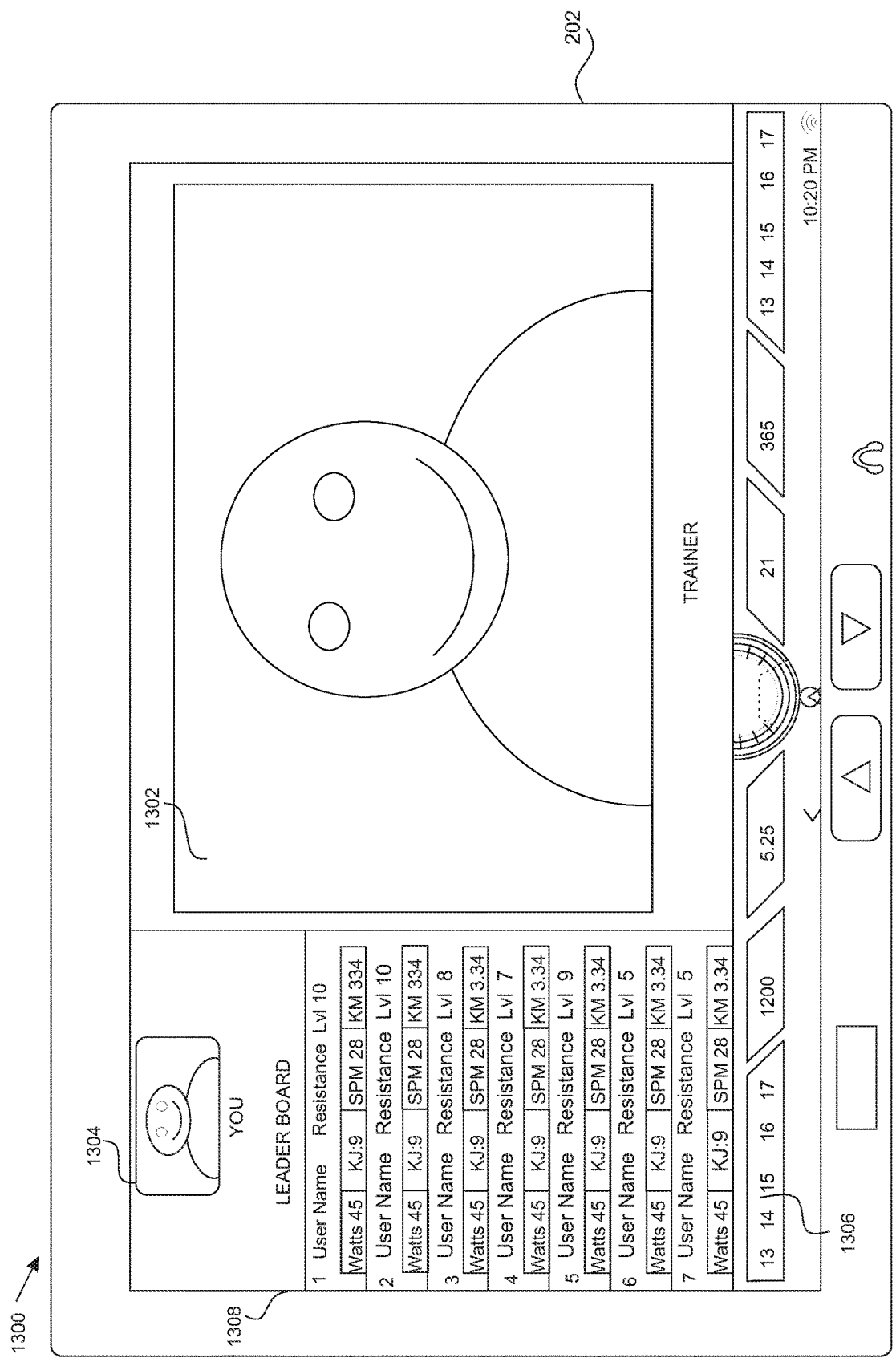
FIG. 13 illustrates an example graphical interface screen on the display screen of one of the exercise devices of FIG. 10, in accordance with an example embodiment.

FIG. 13 illustrates an example graphical interface screen 1300 on the tablet 202 of one of the exercise devices 102 of FIG. 10, in accordance with an example embodiment. 1302 is a live video of the trainer. 1304 is video from a front facing camera 282 of the tablet 102 so that user can see image of him/herself being streamed to the trainer and other users. 1306 is the user's metrics. 1308 is all users' metrics. The user can use the buttons 274, 276 to further manually adjust their own resistance, even after the user's particular exercise device 102 receives collective resistance adjustments from the trainer exercise device 1000.

Figure 14:
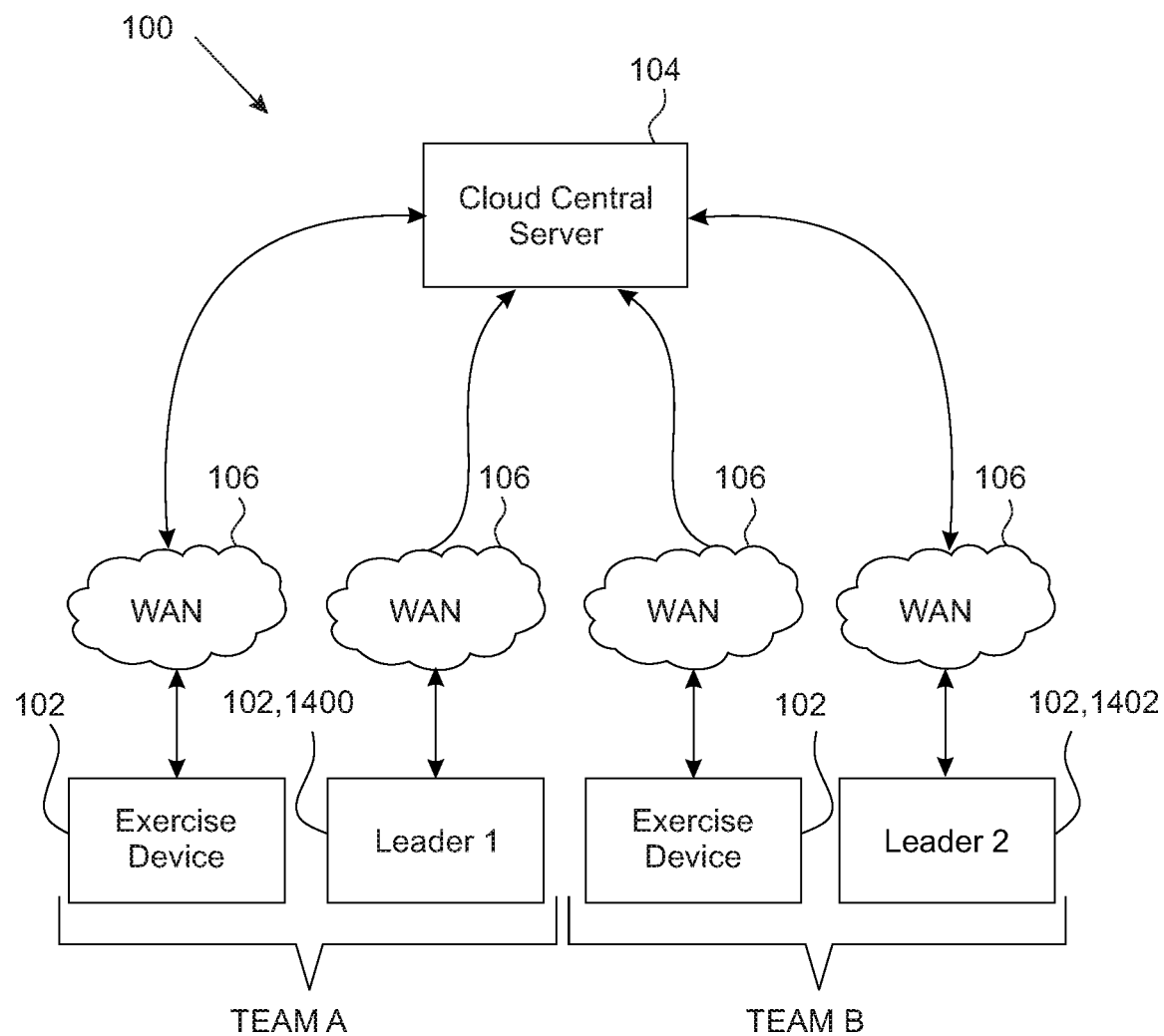
FIG. 14 illustrates a block diagram of an example implementation of the system of FIG. 1, having two of the exercise devices each designated as a respective leader device, in accordance with an example embodiment.

The "2) User on another machine (human)", introduced above, will now be described in greater detail. This can be implemented through the "Grand Prix" and "Zombie Apocalypse" games. FIG. 14 illustrates a block diagram of an example implementation of the system 100, having two of the exercise devices 102 each designated as a respective leader exercise device 1400, 1402, for a virtual training session in accordance with an example embodiment. Each leader exercise device 1400, 1402 is used by one of the users, and each of whom is designated as a leader or trainer of their own group of users of the exercise devices 102. As shown in FIG. 14, the first leader exercise device 1400 is designated as the leader of team "A", and the second leader exercise device 1402 is designated as the leader of team "B". Although one additional exercise device 102 is illustrated per team, in some example embodiments each team can comprise a plurality of further exercise devices 102 per team. In another example embodiment, one person (who is the team leader of himself) is against a team of a plurality of exercise devices 102.

Figure 15:
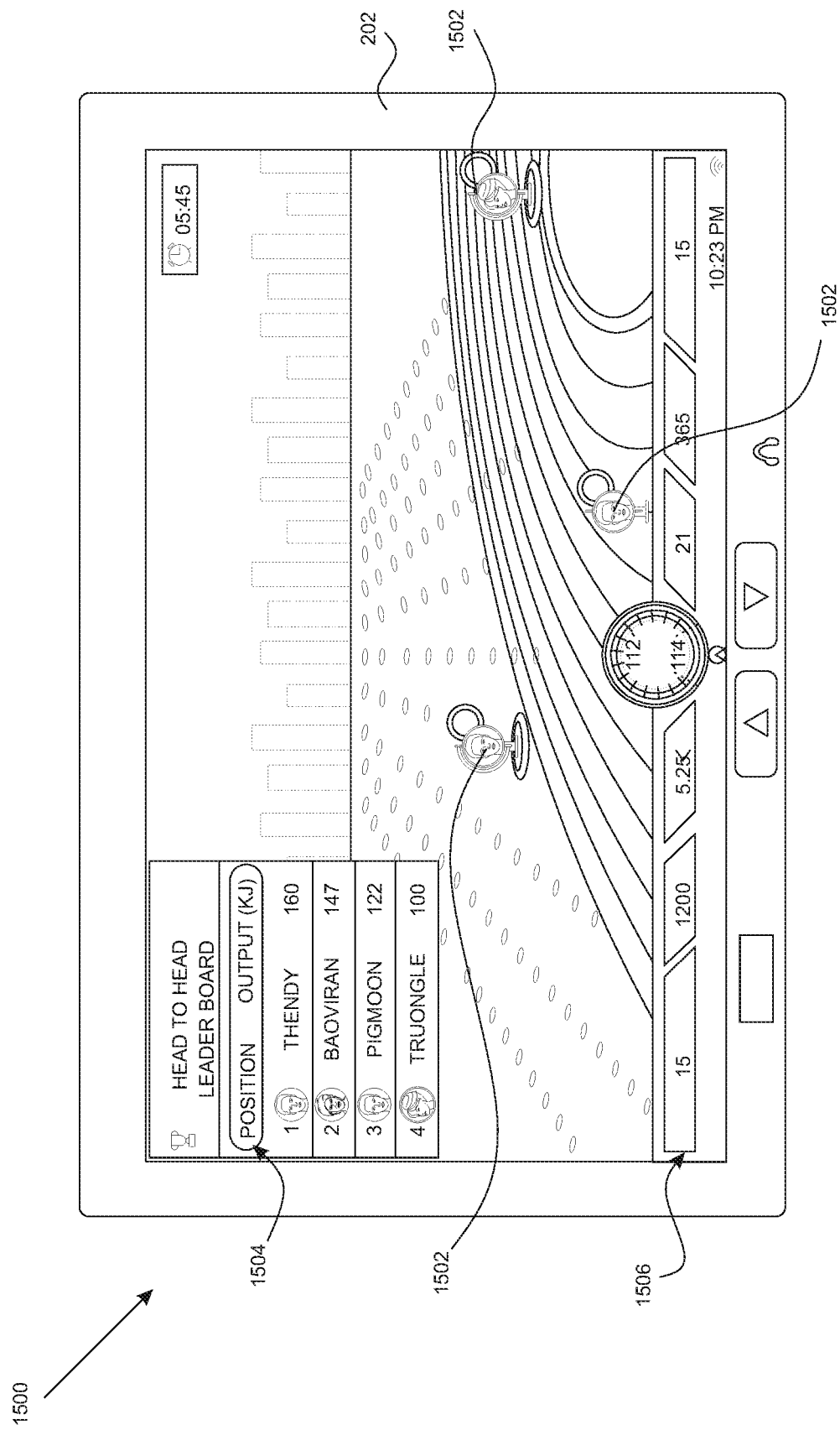
FIG. 15 illustrates an example graphical interface screen on the display screen of one of the exercise devices of FIG. 1, in accordance with an example embodiment.

FIG. 15 illustrates an example graphical interface screen 1500 on the tablet 202 of one of the exercise devices 102 for a virtual training session, in accordance with an example embodiment. This represents the "Grand Prix" game and "2) User on another machine (human)", mentioned above. Each user of each exercise device 102 is represented by a respective avatar 1502 on the graphical interface screen 1500. 1504 is a leaderboard. 1506 is user's metrics. The respective avatar 1502 has a virtual speed along the displayed track in proportion to the exercise power of the respective exercise device 102. The respective avatar 1502 has a virtual distance along the track in proportion to the total energy (e.g. kJ or Cal) performance of the respective exercise device 102.

In another example embodiment, not shown, there are only two avatars displayed, one for each team, that reflects the collective output by each respective team.

Figure 16:
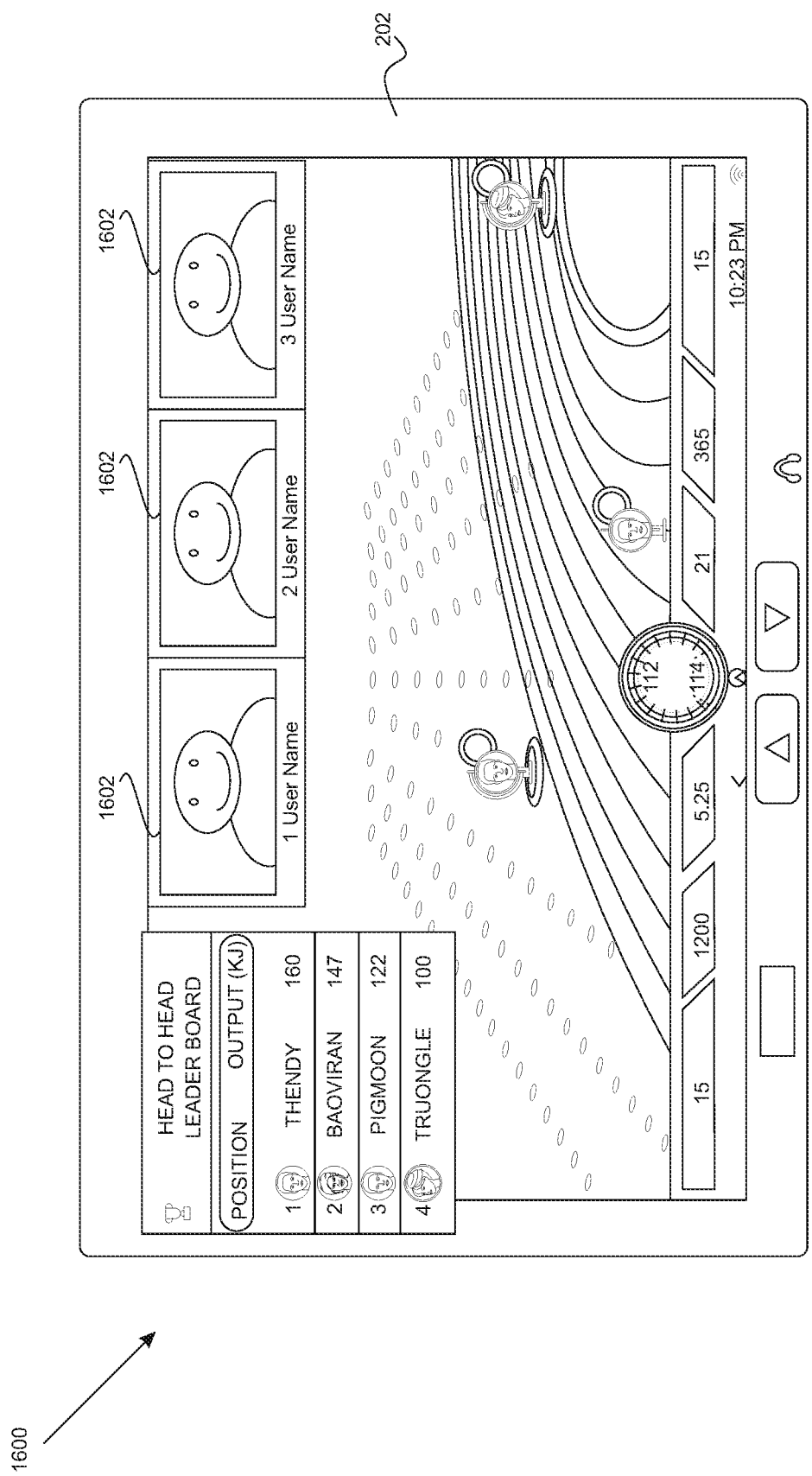
FIG. 16 illustrates another example graphical interface screen on the display screen of one of the exercise devices of FIG. 1, in accordance with another example embodiment.

FIG. 16 illustrates another example graphical interface screen 1600 on the tablet 202 of one of the exercise devices 102 for a virtual training session, in accordance with another example embodiment. This is similar to the graphical interface screen 1500, except in this example embodiment there are additional live videos 1602 of one or more of the users, captured from their respective camera 282. Live video 1602 of all users can be displayed, or users on the same "team" can be displayed, in an example embodiment.

Group training is performed with group of users. The group leader can make resistance adjustments simultaneously/concurrently to a select group (e.g. team) of the virtual exercise session, or the entire group. Group leader can be selected: during the workout (e.g. person with highest watts after x minutes or person in #1 pole position); or before the workout; or selected at random; or the host of workout selected (e.g. one user creates the workout and invites friends); or any user who is making resistance adjustments. The group leader can make resistance adjustments to users equipment in real time via a user input device, e.g. the touch screen or buttons 274, 276 via GPIO. Adjustments are broadcasted to other users simultaneously for implementation of the instructed amount of increase or decrease. Two-way communication between users via camera 282 (displayed via touch screen 272) and microphone (heard via speakers or headphones 280). Users can see other live video feed and metrics (including current resistance level).

An example scenario will now be described. 10 users join a workout, and are split into 2 teams of 5 (Team A and B). Workout length is 10 minutes. It is a team race. Team leaders may be selected prior to starting. Team leaders control their teams' resistance level. Adjustments can be made using the touch screen or GPIO. This causes a same resistance adjustment to the exercise devices 102 of the team members, including the team leader's exercise device 1400, 1402. Team leaders need to be cognizant of not only the other team, but their own team members' performance. For example, team A leader notices team B catching up, with only 2 minutes left, team A leader increases resistance using the up button 274. This causes an increase of resistance by one unit to all members of team A including the team leader's own first leader exercise device 1400. Everyone on team A tries to maintain their speed (strokes per minute, SPM) in order to maintain their lead.

Figure 20:
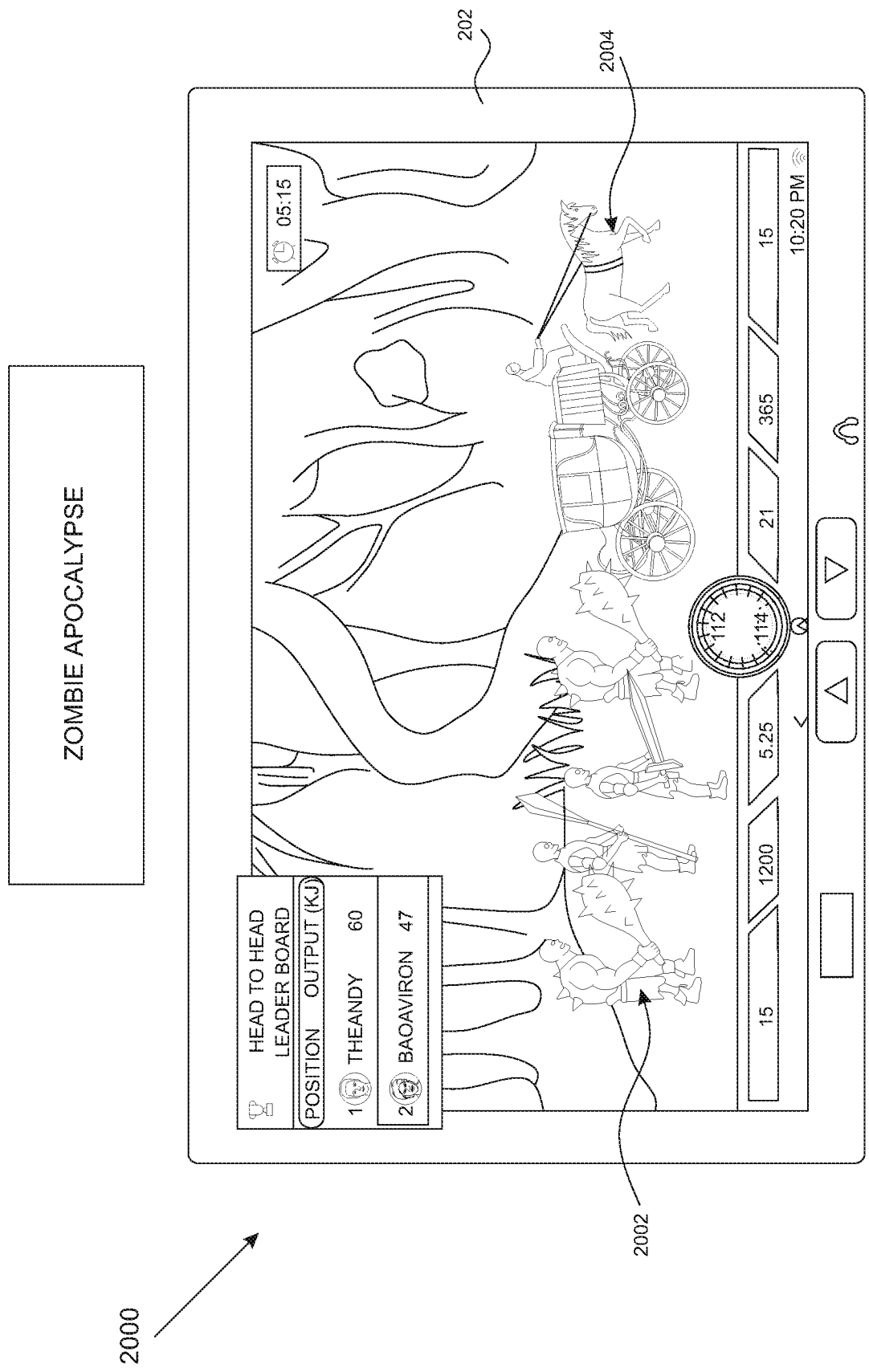
FIG. 20 illustrates another example graphical interface screen on the display screen of one of the exercise devices of FIG. 1, selected from the game selection graphical interfaces of FIG. 18, in accordance with another example embodiment.

Another example scenario will now be described, with reference to FIG. 20. Five users join a workout, specifically "Zombie Apocalypse". Workout length is 10 minutes. As previously described, all users are represented by a single horse and wagon as the avatar 2004, trying to run from killer zombies (AI) 2002. The users work together as a single object. Team leaders may be selected prior to starting. Team leaders control their teams' resistance level. Adjustments can be made using the touch screen or GPIO. This causes a same resistance adjustment to the exercise devices 102 of the team members, including the team leader's exercise device 1400, 1402. Team leaders need to be cognizant of the performance of their entire team. For example, team leader notices the zombies catching up. With only 2 minutes left, team leader increases resistance by double using the up button 274. This causes an increase of resistance to all members of the team including the team leader's own first leader exercise device 1400. Everyone on team tries to maintain their speed (strokes per minute, SPM) in order to maintain their lead but because the team leader was not cognizant of the performance of a very weak team member, the increases resistance was too overwhelming for the weak team member and resulted in poorer overall performance and lead to the zombies catching up and ending the game before time ran out.

Figure 21:
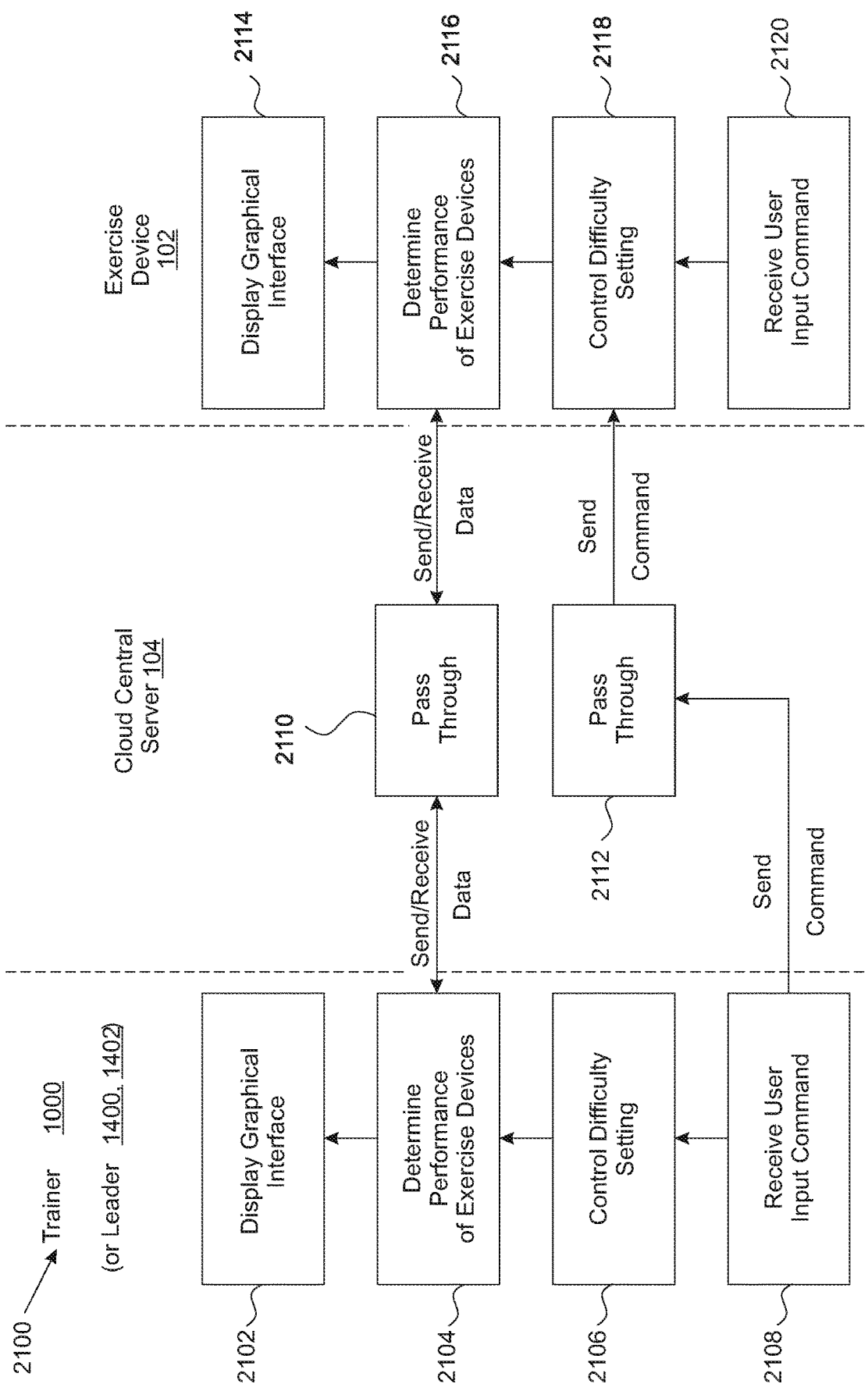
FIG. 21 illustrates an example block diagram of a method for a shared virtual training session, in accordance with an example embodiment.

Reference is now made to FIG. 21, that illustrates an example block diagram 2100 of a method for a shared virtual training session, in accordance with an example embodiment. Arrows are used to indicate data flow. The block diagram 2100 includes the trainer exercise device 1000 (FIG. 10) or the leader exercise device 1400, 1402 (FIG. 14). The shared virtual training session is with the cloud central server 104 and other exercise devices 102 (one shown) over the network (e.g. WAN 106).

The method comprises displaying 2102 on the graphical interface of the trainer exercise device 1000, based on communication over the network, an avatar for each of the exercise devices 102 during the shared virtual exercise session. The virtual speed of each avatar is required so that each avatar appears to move on the graphical interface. The virtual speed is proportional to the exercise power (Watts) of each exercise device 102. The virtual distance of each avatar is proportional to the total energy (e.g. Cal or Kj) of the performance of the exercise device 102. In order to determine exercise performance, at event 2104 the exercise performance of each exercise device 102 is determined. This includes, for example, knowledge of the current difficulty (resistance) setting of the trainer exercise device 1000 (from event 2106) and the speed (rpm) of the flywheel 262 of the trainer exercise device 1000. Each exercise device 102 can start with a custom initial baseline difficulty setting. At event 2110, the cloud central server 104 is configured to pass through data for the performance of the exercise devices 102, so that the speed of the avatars can be determined and displayed onto each exercise device 102. In an example embodiment, the cloud central server 104 can forward the raw data, or convert and forward received data to speed data, or to other suitable converted data or normalized data, or can generate and send the entire graphical interface screens.

At event, 2106, the trainer exercise device 1000 controls its rower 200 to one or more difficulty settings during the shared virtual exercise session. At event 2108, the trainer exercise device 100 receives a user input command from the user input device during the shared virtual exercise session, for example through up button 274 or down button 276 or though the touch screen of the tablet 202. The purpose of the command is to perform a same increase or decrease to a plurality of the exercise devices 102, relative to the current difficulty setting of each exercise device 102. In response to the user input command, the processor of the tablet 202 causes a same adjustment to a respective current difficulty setting of at least two, or all, of the exercise devices 102 during the shared virtual exercise session. As shown in FIG. 21, receiving the user input command at event 2108 causes the difficulty setting of the trainer exercise device 1000 to be controlled (event 2106). As well, the same amount of adjustment (increment amount or decrement amount) is performed on the one or more of the other exercise devices 102, applied to their respective current difficulty setting. At event 2112, the cloud central server 104 is configured to pass through the command, for example receive the command from the trainer exercise device 1000 and send the command to one or more of the other exercise devices 102. In an example embodiment, event 2106 can also have its resistance setting adjusted from commands by the cloud central server 104, for example from virtual world events, AI decisions, or a command from another user.

The other non-trainer exercise devices 102 of the block diagram 2100 will also be described. At event 2114, the exercise devices 102 displays 2102 on its graphical interface, based on communication over the network, an avatar for each of the exercise devices 102 (including the trainer exercise device 1000) during the shared virtual exercise session. In order to do so, at event 2116 the performance of each exercise device 102 is determined. This includes, for example, knowledge of the current difficulty (resistance) setting of the exercise device 102 and the speed (rpm) of the exercise device 102. At event, 2118, the exercise device 102 controls its rower 200 to one or more difficulty settings during the shared virtual exercise session. At event 2110, the cloud central server 104 is configured to pass through data for the performance of the exercise devices 102, so that the speed of the avatars can be determined and displayed onto each respective tablet 202 of each exercise devices 102. From pass through event 2112, the difficulty settings are commanded (event 2118) based on receiving of the command from the trainer exercise device 1000. This is an increment or decrement command from the current difficulty setting of each exercise device 102. At event 2120, the user of the exercise device 102 can perform further custom adjustments (increment/decrements) to the difficulty setting of their own exercise devices (event 2118), for example using buttons 274, 276.

In an alternate example embodiment, a single avatar is used to represent a collective exercise performance of a group of the exercise devices 102, including the trainer exercise device 1000. In an example embodiment, the group of the exercise devices 102 are on one same team, and are against another group of exercise devices 102 on another team. In another example embodiment, all of the exercise devices 102 in the virtual exercise session are represented by the single avatar.

The "3) AI as trainer" will now be described in greater detail. Training is performed with assistance from AI. AI mimics human trainer. This can be done by single person or group of persons simultaneously. AI receives user's or users' metrics in real time. E.g. current resistance, distance, watts, output (Kj), speed, strokes per minute (spm), rotations per minute (rpm), calories, pole position, etc. For a group, the targets can be a collective target, and the adjustments to the resistance settings can be made (pushed) collectively to all users based on real time collective performance.

AI mimics actions of trainer and adjusts resistance based on below using algorithm: Historical user metrics; Targets; Live metrics (metrics include: SPM, heart rate, calories burned, watts, output (KJ), time, distance). Resistance adjustments can be: Pushed to individual user (1 to 1); Broadcasted to multiple users (1 to many). AI can set metric targets such as heart rate, distance, spm, rpm, watts, output, etc., for each individual user or for multiple users. Users can see other users: Live video feed; Metrics (including resistance level).

Figure 17:
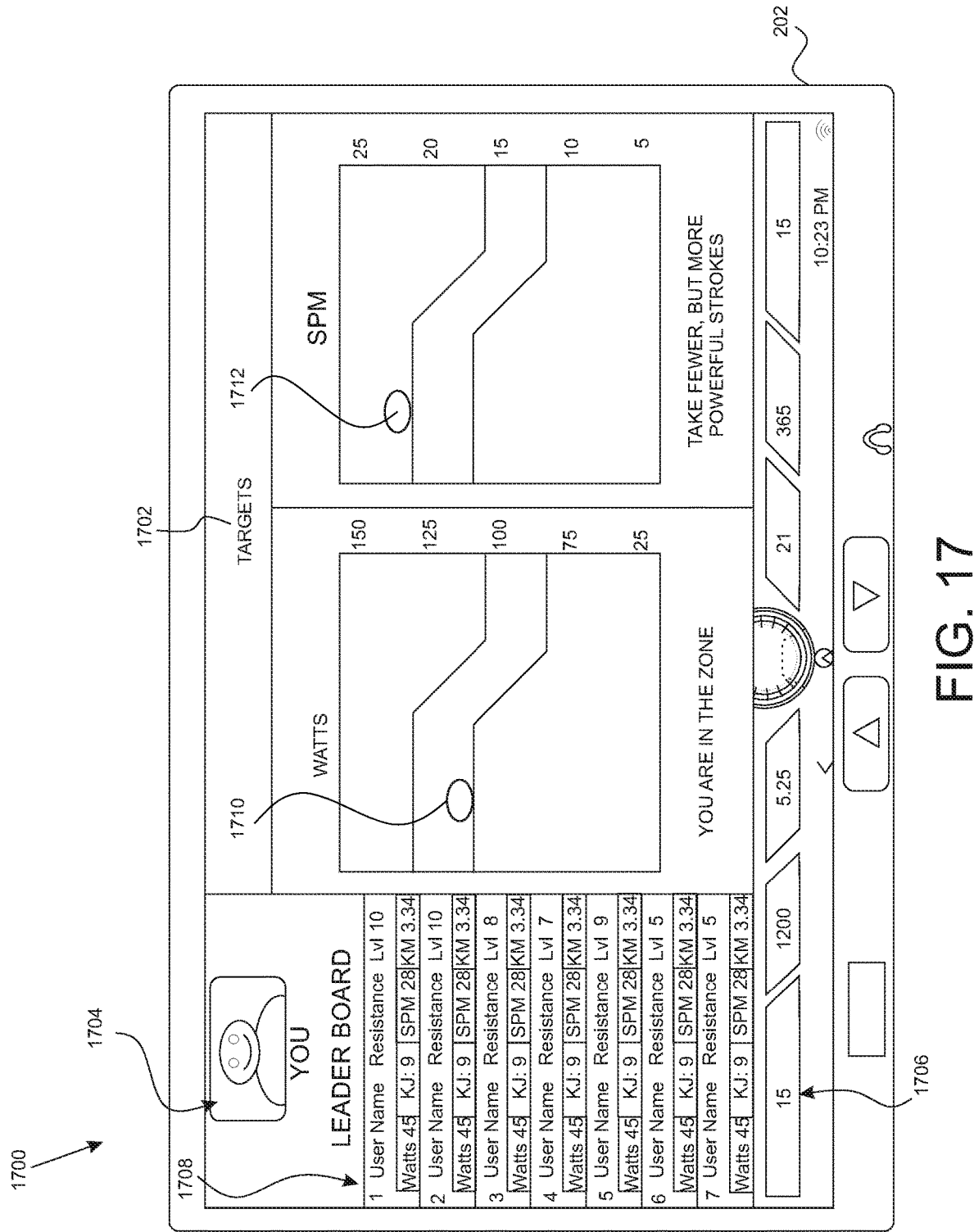
FIG. 17 illustrates another example graphical interface screen on the display screen of one of the exercise devices of FIG. 1, in accordance with another example embodiment.

FIG. 17 illustrates another example graphical interface screen 1700 on the tablet 202 of one of the exercise devices 102 for a virtual training session, in accordance with an example embodiment. At 1702, targets are set by the AI program, in an example embodiment. As shown in the graphical interface screen 1700, the performance targets 1702 are provided so that performance 1710 is within a band of Exercise Power (Watts) and performance 1712 is within a band of SPM (both shown). User must try to have their performance 1710, 1712 stay within respective target zone(s) of the performance targets 1702. Being with the target zone means the exercise performance 1710, 1712 is above one minimum target and below another maximum target. In the SPM example shown in FIG. 17, the user's performance 1712 for SPM is above the target zone of the performance target 1702. Instructions are provided to an output such as the display or audio output device to help the user stay in the zone. Resistance is automatically adjusted based on how the user is performing, in an example embodiment. For example, if the user continues to fall below target zone, resistance and one or both targets 1710, 1712 will decrease, in an example embodiment. 1704 is user profile icon. 1706 is user detailed metrics. 1708 is a leaderboard with all users' metrics.

A human trainer sets targets such as watts, output, speed, rotations per minute (rpm), strokes per minute (spm) and calories for participants/users during the workout session. The targets are typically planned ahead of time, but adjustments can be made during the workout based on a variety of factors such as user energy level, live metrics and feedback. In addition, the trainer also adjusts resistance level, increasing and decreasing the level of difficulty. The purpose of setting and adjusting targets and resistance is to provide users with a challenging and fun workout experience.

An AI trainer mimics the actions of a human trainer by setting and adjusting resistance levels. Targets can be pre-programmed based on a schedule. A baseline or starting resistance level is set for each individual user prior to the workout. Users have 2 options: 1) Manually set baseline (easy—level 3/medium—level 6/hard—level 9); 2) Automatically set baseline. This option recommends a baseline based on the users historical performance. It does this by averaging the users watts from the last 3 workouts, or as many (1 or 2 if user has not completed 3) workouts with duration +/−5 minutes (e.g. when the workout is 20 minutes long, it will compare the user's last 3 workouts that are between 15 and 25 minutes long). If the user is participating as a guest or does not have any previous workouts within duration of +/−minutes, then this option is greyed out. Based on the user's historical average watts, and comparing it to past users who performed this workout, the AI can recommend the most appropriate baseline. User's resistance is adjusted up and down from their baseline based on the pre-programmed workout. However, adjustments may be further adjusted in real time based on: 1) Targets; and 2) Live metrics.

During the workout section, If the user is under (exceeding) their target by 20% or more for 30 seconds, their resistance level will temporarily decrease (increase) by 1 for the duration of the current section (e.g. warmup, hill climb, sprint) of the workout.

During the same workout section, If the user continues under (exceeding) their target by 20% or more for 30 seconds, their resistance level will permanently decrease (increase) by 1, effectively decreasing (increasing) their baseline by 2.

During the same workout section, if the user continues under (exceeding) their target by 20% or more for 30 seconds, their resistance level will again, permanently decrease (increase) by 1, and so on.

An example workout session is as follows:

0-5 minutes: warmup. RPM target=15-20, Watts target=100-150, Default resistance level.

6-10 minutes: hill climb. RPM target=10-15, Watts target=300-350, Resistance level +7.

11-13 minutes: break.

14-15 minutes: ramp up. RPM target=15-20, Watts target=100-150, Resistance level −7.

16 minute: sprint. RPM target=25-30, Watts target=350-400, Resistance level −2.

17 minute: recovery, RPM target=10-15, Watts=50-100, Resistance level +2

18 minute: sprint. RPM target=25-30, Watts target=350-400, Resistance level −2.

19 minute: recovery. RPM target=10-15, Watts=50-100, Resistance level +2.

20 minute: sprint. RPM target=25-30, Watts target=350-400, Resistance level −2.

An example workout session with a struggling user is as follows:

User selects "Medium—Level 6" difficulty. Baseline resistance is 6.

0-5 minutes: warmup. RPM target=15-20, Watts target=100-150, Resistance level 6.

6-10 minutes: hill climb. RPM target=10-15, Watts target=300-350, Resistance level +7 to 13. User is under target by more than 20% for 30 seconds. Resistance level decreases by 1 to 12.

11-13 minutes: break. Resistance level increases by 1 to 13 because the previous workout section is completed.

14-15 minutes: ramp up. RPM target=15-20, Watts target=100-150, Resistance level −7 to 6.

16 minute: sprint. RPM target=25-30, Watts target=350-400, Resistance level −2 to 4. User is under target by more than 20% for 30 seconds. Resistance level decreases by 1 to 3. User is continues under target by more than 20% for 30 seconds. Resistance level decreases by 1 to 2 permanently.

17 minute: recovery. RPM target=10-15, Watts=50-100, Resistance level +2 to 4.

18 minute: sprint. RPM target=25-30, Watts target=350-400, Resistance level −2 to 2.

19 minute: recovery. RPM target=10-15, Watts=50-100, Resistance level +2 to 4.

20 minute: sprint. RPM target=25-30, Watts target=350-400, Resistance level −2 to 2.

For a group, the targets can be a collective target for all users determined by the AI of the cloud central server 104, and the same adjustments (e.g., increase or decrease adjustment amount) to the resistance settings can be made (pushed) collectively to all users based on real time collective performance in comparison to the target. For example, the sum of exercise performance (power or speed) of all users can be determined to be above or below the target threshold. In response to this determination, the same adjustment, such as +X or −X to the current resistance setting of each exercise device 102, is commanded by the AI of the cloud central server 104 to be adjusted on all of the exercise devices 102.

Figure 22:
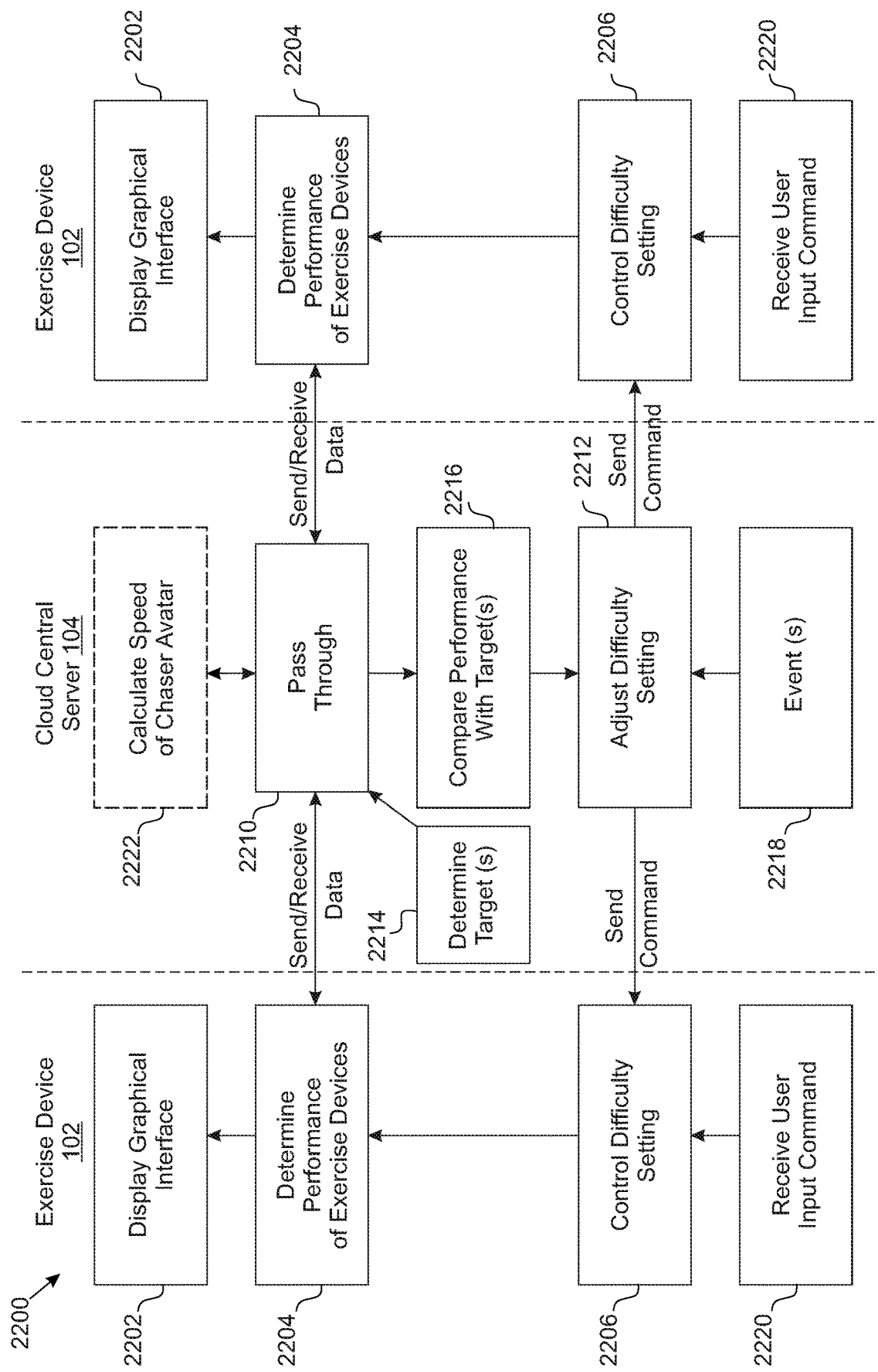
FIG. 22 illustrates an example block diagram of a method for a shared virtual training session, in accordance with an example embodiment.

Reference is now made to FIG. 22, that illustrates an example block diagram 2200 of a method for a shared virtual training session, in accordance with an example embodiment. This can be used for "4) AI as challenge", introduced above. Arrows are used to indicate data flow. The block diagram 2200 illustrates a plurality of exercise devices 102 and the cloud central server 104, in communication over the network (e.g. WAN 106). Two exercise devices 102 are shown in this example of FIG. 22.

The method comprises displaying 2202 on the graphical interface of the exercise device 102, based on communication over the network, an avatar for each of the exercise devices 102 during the shared virtual exercise session. The virtual speed of each avatar is required so that each avatar appears to move on the graphical interface. The virtual speed is proportional to the exercise power (Watts) of each exercise device 102. In order to do so, at event 2204 the performance of each exercise device 102 is determined. This includes, for example, each the exercise device 102 having knowledge of their own current difficulty (resistance) setting, and their own speed (rpm) of the flywheel 262. Each exercise device 102 can start with a custom initial baseline difficulty setting (manual or automatically assigned based on user history), each difficulty setting is then collectively adjusted by a same amount during the virtual exercise session. At event 2210, the cloud central server 104 is configured to pass through data for the performance of the exercise devices 102, so that the speed of the avatars can be determined and displayed onto each exercise device 102. In an example embodiment, the cloud central server 104 can forward the raw data, or convert and forward received data to speed data, or to other suitable converted data or normalized data, or can generate and send the entire graphical interface screens.

At event, 2206, the exercise device 102 controls its rower 200 to one or more difficulty settings during the shared virtual exercise session. This can include the cloud central server 104, at event 2212, determining the amount of increase or decrease for adjusting difficulty settings, and sending commands from the cloud central server 104 to the exercise devices 102 to perform a same adjustment of the difficult setting by a same increment or a same decrement from their respective current difficulty setting (event 2206). This allows the cloud central server 104 to implement training sequence, for example. At event 2220, in an example embodiment, the user of the exercise device 102 can perform further manual adjustments (increment/decrements) to the difficulty setting of their own exercise devices (event 2206), for example using buttons 274, 276. The user input command at event 2220 can also be used to set the initial difficulty resistance at the start of the shared virtual exercise session, for example using the buttons 274, 276 or a game level (beginner/intermediate/advanced).

At event 2214, the cloud central server 104 can be configured to determine targets for each user of each of the exercise devices 102, for example from previous historical exercise sessions. The cloud central server 104 can also be configured to determine collective targets for all of the users of the exercise devices 102. This can be a sum or average, for example. In example embodiments, targets can include exercise power (Watts; Cal/hr) or rowing speed (RPM). At event 2216, the performance of each exercise device 102 is received from pass through 2210, and a comparison can made based on criteria based on the targets. For example, a comparison can be made that the collective performance of the exercise devices does or does not meet targets. At event 2212, when performance of the exercise devices during the shared virtual exercise session does not meet targets, the cloud central server 104 commands all of the exercise devices 102 to perform a same adjustment to a respective current difficulty setting of the respective exercise device 102.

At event 2218, additional events can be determined and implemented by the cloud central server 104. For example, a "Dense Fog" animation, described herein, can be implemented and appear on the graphical interfaces (event 2202), and increase the same amount of resistance of all exercise devices 102 at event 2206, for a specified period of time.

The "4) AI as challenge" mentioned above will now be described in greater detail. This comprises training with AI. This can include single person or group of persons simultaneously. AI receives users metrics in real time. E.g. Current resistance, distance, watts, output (Kj), speed, strokes per minute (spm), rotations per minute (rpm), calories, pole position, etc. AI character "chases" user(s) and generates elements and objects that are placed into the workout environment to increase or decrease resistance. Virtual speed of Main Character (MC) on the game is dependent on exercise power (Watts or Kj).

In an example embodiment, AI generates elements and objects based on below using algorithm: Historical user metrics; Targets; Live metrics. Metrics include but not limited to: SPM, heart rate, calories burned, watts, output (KJ), time, distance. Objects and elements can affect: Individual user; Individual user part of a group of users (1 of many); Broadcasted to multiple users (to many). Users can see other users: Live video feed; Metrics (including resistance level).

Figure 19:
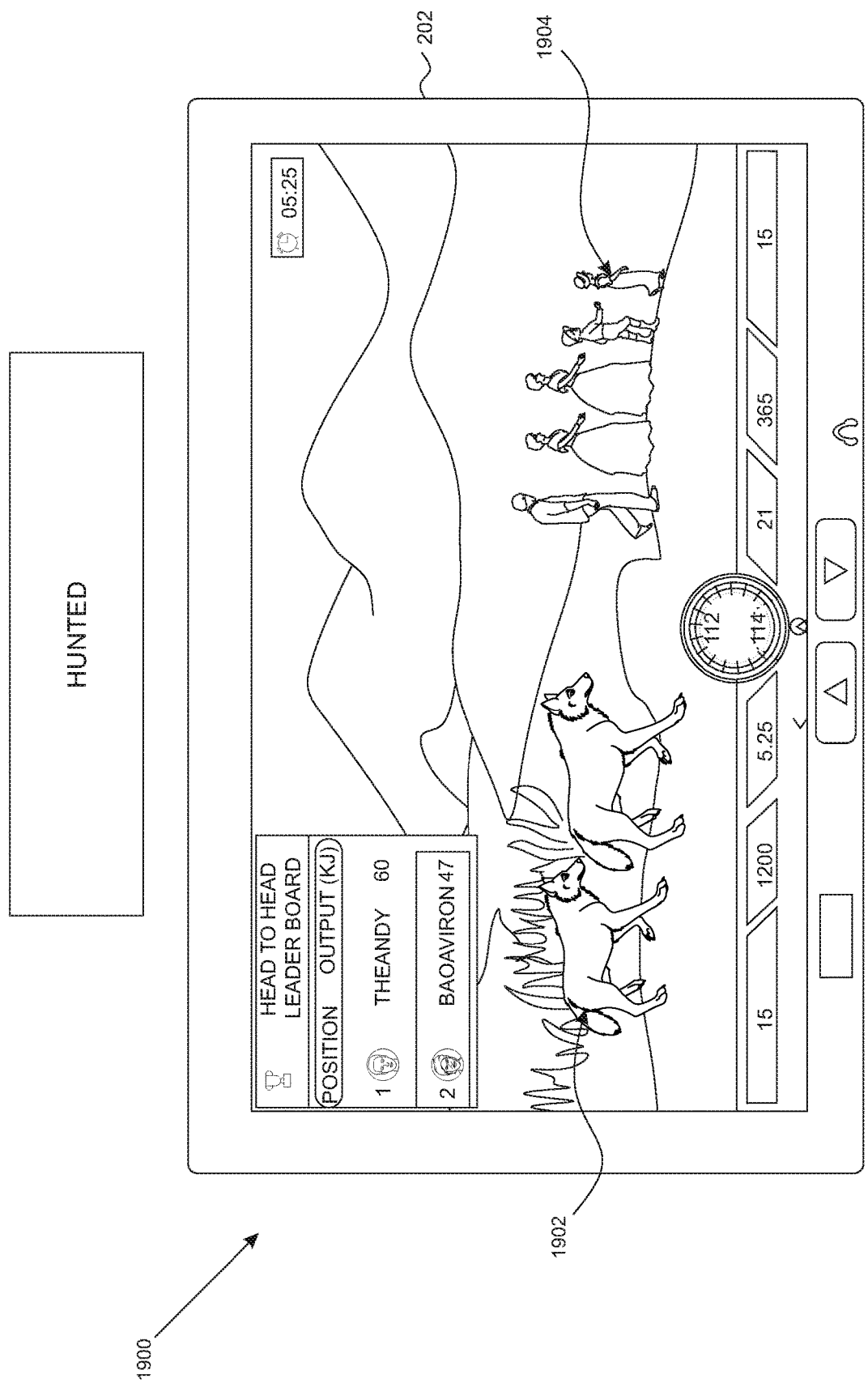
FIG. 19 illustrates an example graphical interface screen on the display screen of one of the exercise devices of FIG. 1, selected from the game selection graphical interfaces of FIG. 18, in accordance with an example embodiment.

FIG. 19 illustrates an example graphical interface screen 1900 on the tablet 202 of one of the exercise devices 102, for a game "Hunted", in accordance with an example embodiment. FIG. 20 illustrates an example graphical interface screen 2000 on the tablet 202 of one of the exercise devices 102, for a game "Zombie Apocalypse", in accordance with an example embodiment. FIG. 20 can be used to implement "2) User on another machine (human)" and "4) AI as challenge", describe above, for example.

User or users, working individually ("Hunted" in FIG. 19) or together as a team ("Zombie Apocalypse" in FIG. 20), are being chased by an object or animation on the screen. A user can also play a game by himself (e.g. "Last Hope", graphical interface not shown). AI adds objects or elements such as: Dense fog (increases resistance); Boost star (virtual speed is maintained regardless of device performance); Boss (virtual speed must increase by X % within Y seconds); Floor angle inclines/declines result in increase/decrease in resistance, in an example embodiment.

The "Hunted" game of FIG. 19 will now be described, in accordance with an example embodiment. Hunted is a 2D, side scrolling, endless runner and parallax game. The object of this game is to outrun wolves 1902 and other player avatars 1904 for a set period of time (2, 5, 10 or 15 minutes). The wolves 1902 are AI. The wolves 1902 win if they kill all the players by matching the output (e.g. kJ or Cal) of every player, taking into account the head start. It can be played with a minimum of 2 players. There is an individual Main Character (MC) avatar 1904 displayed for each user of each exercise device 102.

The story is as follows. Year is "medieval era". A family are in a wagon with horses. There are wolves 1902 and they spook the horses, flipping the wagon. The family must escape for their lives. If the user wins, a finishing frame/image will be displayed: only silhouette of one generic person standing in front of big castle doors. Only shows 1 random person in case everyone else dies. One cannot determine which character the one person is from the silhouette. If the user loses, a finishing frame/image will be displayed: only silhouette of one generic person being eaten by lots of wolves. At the beginning of the game, the MC avatars 1904 are positioned ahead of the wolves 1902, for example 15 seconds ahead calculated from the average baseline exercise power of all of the users. In another example embodiment, the MC avatars 1904 are positioned a specified amount of virtual distance (kJ or Cal) ahead of the wolves 1902.

Hunted is an endless side-scrolling game with very similar mechanics as Warm Up. If the user is playing alone, the application will look for 1 additional online player. If the application cannot find an additional player (after looking for 45 seconds), it will automatically generate an AI player. The user is not able to tell that the AI player is not a real person. The AI player will have a random baseline between +10% to −30% of the user (the AI will be slower than the user 75% of the time, to make the user feel like they are better). The wolves AI will have a random baseline between +5% to −15% of the average baseline of the user and AI player.

If the user is playing with others, they can invite additional people (e.g., using meeting room). The wolves AI will have a random baseline between +5% to −15% of the combined (average) baseline of all the players. Every time a player is eliminated, the wolves AI baseline is adjusted to the average on the remaining player(s). If the user loses, their baseline will lower by 10% for future games. If the user wins, they will have a new baseline calculated from the most recent challenge for future games.

Other elements can be involved. For example, Boost Star, Dense Fog, Boss, etc., as described herein. These events can randomly occur every 2-3 minutes.

In an example embodiment, any these events can be manually triggered by one of the users using their respective exercise device 102, such as the trainer. The trainer can trigger using a user input device such as the touch screen or a button to the GPIO of the microcontroller 210, for example.

Main Character (MC) avatars 1904: the MC avatars 1904 can be characters: E.g. 1. Daughter (little girl); 2. Son (little boy); 3. Father; 4. Mother; 5. Grandmother. If there are 2 players, then the two MCs will be selected at random. If there are 3 players, then the three MCs will be selected at random. If the user's avatar 1904 is ahead and the wolves 1902 cannot be seen (because they are too far behind), a small icon will display how many output (Kj) the wolves 1902 are away from the main character avatar 1904.

The "Zombie Apocalypse" game of FIG. 20 will now be described, in accordance with an example embodiment. Zombie Apocalypse is a 2D, side scrolling, endless runner and parallax game. The object of this game is to outrun zombies for a set period of time (2, 5, 10 or 15 minutes). The zombies 2002 are AI. A single Main Character (MC) avatar 2004 represents collective performance of all of the exercise devices 102. The zombies 2002 win if their output (kJ) matches the total users' output (total kJ), taking into account the head start. It can be played with at least 2 players.

The story is as follows: The year is 1600s. A small town is being attacked by thousands of zombies. But the people of the town are protected from the zombies because they have built a massive wall. But there are so many zombies that they finally manage to break through the doors and climb the wall. The royal family packs all their belongings and try to escape on their wagon. If the user(s) win, a finishing frame/image will be displayed: Wagon and the sun rise. If the user(s) lose, a finishing frame/image will be displayed: Zombies surrounding the people and the broken wagon. At the beginning of the game, the MC avatar 2004 is positioned ahead of the zombies 2002, for example 15 seconds ahead calculated from the total baseline exercise power of all of the users. In another example embodiment, the MC avatar 2004 is positioned a specified amount of virtual distance (kJ) ahead of the zombies 2002.

Zombie Apocalypse is an endless side-scrolling game with very similar mechanics as Warm Up. If the user is playing alone, the application will look for 1 additional online player. If the application cannot find an additional player, it will automatically generate an AI player (after looking for 45 seconds). The user is not able to tell that the AI player is not a real person. The AI player will have a random baseline between +10% to −30% of the user (the AI will be slower than the user 75% of the time, to make the user feel like they are better). The zombies AI will have a random baseline between +5% to −15% of the average baseline of the user and AI player.

If the user is playing with others, they can invite additional people (meeting room). The zombies AI will have a random baseline between +5% to −15% of the average baseline of all the players. If the user(s) loses, their baseline will lower by 10%. If the user wins, they will have a new baseline calculated from the most recent challenge.

Other elements can be involved, in an example embodiment. For example, Boost Star, Dense Fog, Boss, etc., as described herein. In an example embodiment, these events can randomly occur every 2-3 minutes.

In an example embodiment, any these events can be manually triggered by one of the users using their respective exercise device 102, such as the trainer. The trainer can trigger using a user input device such as the touch screen or a button to the GPIO of the microcontroller 210, for example.

The Main Character (MC) avatar 2004 can be a wagon with horse. If the user loses/zombies catch the wagon, the wagon wheel will break and stop. If the user avatar 2004 is ahead and the zombies 2002 cannot be seen (because they are too far behind), a small icon should display how many output (Kj) the zombies 2002 are away from the main character avatar 2004.

The "Last Hope" game (not specifically shown) will now be described, in accordance with an example embodiment. Last Hope is a 2D, side scrolling, endless runner and parallax game. The object of this game is to outrun zombies for a set period of time (2, 5, 10 or 15 minutes). The zombies are AI in an example embodiment. The zombies win if their output matches the user's output. It can be played solo (1 player). The story is as follows: Toxic waste from a facility has infected 99% of the human population, turning them into flesh eating zombies. After months of work in a secret laboratory, you have discovered a cure. The user must deliver the world's only known cure to the Center for Disease Control before being eating alive. If the user wins, a finishing frame/image will be displayed: Scientist standing in front of big castle doors. If the user loses, a finishing frame/image will be displayed: Scientist being eaten by lots of Zombies.

Last Hope is an endless side-scrolling game with very similar mechanics as Warm Up. At the beginning of the game, the MC avatar is positioned ahead of the zombies, for example 15 seconds ahead calculated from the baseline exercise power of the user. In another example embodiment, the MC avatar is positioned a specified amount of virtual distance (kJ) ahead of the zombies. The zombies AI speed is based upon the user's baseline. The zombies will follow a random baseline of between +5 and −15%. The result is the user will win 75% and lose 25% of the time. If the user loses, their baseline will lower by 10%. If the user wins, they will have a new baseline calculated from the most recent challenge.

Other elements can be involved. For example, Boost Star, Dense Fog, Boss, etc., as described herein. In an example embodiment, one of these events can randomly occur every 2-3 minutes.

In an example embodiment, any these events can be manually triggered by one of the users using their respective exercise device 102, such as the trainer. The trainer can trigger using a user input device such as the touch screen or a button to the GPIO of the microcontroller 210, for example.

The Main Character (MC) can be a scientist like from "Frankenstein" movie. The MC will be running. He/She will automatically jump over non-animated objects (e.g. rocks).

If the user is ahead and the zombies cannot be seen (because they are too far behind on the display screen), a small icon should display how many output (Kj) the zombies are away from the main character. In an example embodiment, a blood splat is displayed on the screen when the zombies have caught up to the main character and attacking.

Referring again to FIG. 22, in an example embodiment, in the case of "AI as Challenge", at event 2222 the virtual speed of the chaser avatar is calculated by the cloud central server 104. The chaser avatar is an animation that chases the avatars of the exercise devices 102 during the shared virtual exercise session. The chaser avatar has a virtual speed that is dependent on at least one, at least two, or all, of the respective baseline performance targets of each respective user of each exercise device. Targets can be determined at event 2214. In an example embodiment, this can be the average baseline performance target in the case of each player being represented by a respective MC. In another example embodiment, this can be the collective baseline performance targets in the case of the collective performance of the exercise devices 102 represented by a single MC. A percentage of this value can be used to calculate the speed of the chaser avatar. The speed is sent to the exercise devices 102. The speed can be in terms of exercise power (Watts), or a normalized value, or a speed value. When the chaser avatar reaches one of the avatars on the graphical interface (event 2202), the session ends for that exercise device 102 (or all devices in the collective case, e.g. Zombie Apocalypse). When one exercise device 102 leaves the session, at event 2222 the virtual speed the chaser avatar is re-calculated based on the collective baselines of the remaining users. A percentage of this value can be used to re-calculate the new speed of the chaser avatar.

The "5) Pre-set program (Cloud Server)" mentioned above will now be described in greater detail. This is similar to AI but with pre-set program. Single person or group of persons simultaneously. Pre-set program selected prior to workout. E.g. 2/5/10/20 minutes. E.g. Easy, medium, hard difficulty. E.g. Speed and strength development, muscle development, muscle toning, cardiovascular, weight loss.

Resistance changes can all be pre-set and pushed to users based on:

Schedule: E.g. @ 5 minutes increase resistance by 5. E.g. @ 5 minutes, add "Dense Fog", increase resistance by 5 (e.g. see "Zombie Apocalypse").

Metric algorithm: E.g. <25 SPM decrease resistance by 2. E.g. <25 SPM, add "Dense Fog", increase resistance by 5 (e.g. see "Zombie Apocalypse").

For a group, each exercise device may start with a custom starting baseline resistance setting. For example, in the case of 16 levels, the starting baseline resistance setting can be anywhere from level 1 to level 9, for example. The adjustments to the resistance settings can be made (pushed) collectively to all users. For example, the same adjustment, such as +X or −X levels or units to the current resistance setting of each exercise device 102, is commanded by the AI of the cloud central server 104 to be adjusted on all of the exercise devices 102.

Each of the described graphical interface screens can include more or less elements than those illustrated, in other example embodiments, and depending on the particular application. In addition, some elements of the graphical interface screens may be provided through other outputs, including a second screen provided on a separate device to the tablet 202, or an audio output device, for example.

Referring to FIG. 1, in some example embodiments, exercise devices 102 include the rower 200 or other exercise devices that have adjustable difficulty or adjustable resistance. An example adjustable exercise devices includes a motor that adjusts magnet(s) distance to flywheel, e.g. rower, elliptical/cross trainer, spinning bike, push treadmill. The closer the magnet is to the flywheel, increased resistance. The further the magnet is to the flywheel, decreased resistance.

Another example adjustable difficulty exercise device includes a motor that controls roller rotation speed, such as treadmill speed. Increased roller speed means increased difficulty, increased resistance. Decreased roller speed means decreased difficulty, decreased resistance.

Another example adjustable difficulty exercise device includes a motor that controls deck angle, e.g. treadmill deck incline. Increased incline means increased resistance. Decreased incline means decreased resistance.

Another example adjustable difficulty exercise device includes a motor that controls air flow to a fan. A larger opening allows more air to flow through, decreases resistance. Smaller opening allows less air to flow through, increased resistance. An example is an air bike. The users movement rotates a fan instead of a flywheel. The faster the fan moves, the more natural resistance is applied. In addition, limiting the fan from airflow, for example by narrowing a diaphragm, will also increase resistance. The fan can also cool the user in operation.

The following numbered clauses recite example embodiments.

1. An exercise device for a shared virtual exercise session with one or more other exercise devices over a network, each of the other exercise devices having a respective exercise apparatus having an adjustable difficulty setting, the exercise device comprising:

an exercise apparatus having an adjustable difficulty setting;

a display screen configured to display a graphical interface;

a user input device;

a communication subsystem for communicating over the network;

memory; and at least one processor in operable communication with the display screen, the user input device, a control of the adjustable difficulty setting, and the memory, for executing instructions stored in the memory that, when executed, cause the at least one processor to:

display on the graphical interface, based on communication over the network, at least one representation of users of the exercise devices during the shared virtual exercise session, control the adjustable difficulty setting of the exercise apparatus to one or more of the difficulty settings during the shared virtual exercise session, receive a user input command from the user input device during the shared virtual exercise session, and in response to the user input command, cause a same adjustment to a respective current difficulty setting of at least two of the exercise devices during the shared virtual exercise session.

2. The exercise device as recited in clause 1, wherein said at least two of the exercise devices comprises said exercise device.

3. The exercise device as recited in clause 1, wherein said at least two of the exercise devices comprises all of the exercise devices including said exercise device.

4. The exercise device as recited in clause 1, wherein said at least two of the exercise devices comprises all of said other exercise devices and excludes said exercise device.

5. The exercise device as recited in clause 1, wherein said at least two of the exercise devices comprises a predetermined group of the exercise devices but not all of the exercise devices.

6. The exercise device as recited in clause 1, wherein when a specified event is detected, said at least two of the exercise devices revert to said respective current difficulty setting.

7. The exercise device as recited in clause 1, wherein said same adjustment comprises a same differential change from said respective current difficulty setting of said at least two of the exercise devices.

8. The exercise device as recited in clause 7, wherein said same differential change is incremented or decremented by a unit of difficulty level defined by the respective exercise device.

9. The exercise device as recited in clause 1, wherein said user input command is a single user input command.

10. The exercise device as recited in clause 1, wherein the display screen comprises a touch screen, wherein the touch screen comprises the user input device.

11. The exercise device as recited in clause 1, wherein the user input device comprises an electro-mechanical user input device.

12. The exercise device as recited in clause 1, wherein the network comprises a Wide Area Network (WAN) and/or a Local Area Network (LAN).

13. The exercise device as recited in clause 1, wherein said communication subsystem is configured to communicate with a server over the Internet, wherein said causing said adjustment is performed by at least sending a communication to the server.

14. The exercise device as recited in clause 1, wherein said at least one representation comprises an avatar that has a virtual speed on the graphical interface based on determined exercise performance of the exercise devices.

15. The exercise device as recited in clause 14, wherein said determined exercise performance is exercise power of the exercise devices.

16. The exercise device as recited in clause 1, wherein said at least one representation of the exercise devices comprises a respective avatar that each represents a respective exercise device, each avatar has a virtual speed on the graphical interface based on determined exercise performance of the respective exercise device.

17. The exercise device as recited in clause 1, wherein said at least one representation of the exercise devices comprises a respective real-time video of each user of each respective exercise device.

18. The exercise device as recited in clause 1, wherein the at least one processor is further configured to output a message or animation to the graphical interface that indicates that said same adjustment is performed.

19. The exercise device as recited in clause 1, wherein the same adjustment is caused concurrently on the at least two of the exercise devices.

20. The exercise device as recited in clause 1, wherein the exercise apparatus comprises an adjustable resistance, wherein the adjustable difficulty setting is a resistance setting.

21. The exercise device as recited in clause 1, wherein the adjustable resistance comprises a controllable magnet.

22. The exercise device as recited in clause 1, further comprising at least one sensor operably connected to the at least one processor and configured to detect exercise performance data of the exercise apparatus.

23. The exercise device as recited in clause 1, wherein each exercise device has a starting baseline difficulty setting for the shared virtual exercise session that is customized for each exercise device.

24. A system, comprising:
the exercise device as recited in clause 1; and
said one or more other exercise devices.

25. The system as recited in clause 24, further comprising a server configured to communicate over the Internet with said exercise device and with said one or more other exercised devices.

26. An exercise device for a shared virtual exercise session with one or more other exercise devices over a network, each of the other exercise devices having a respective exercise apparatus having an adjustable difficulty setting, the exercise device comprising:
an exercise apparatus having an adjustable difficulty setting;
a display screen configured to display a graphical interface;
a communication subsystem for communicating over the network;
memory; and
at least one processor in operable communication with the display screen, a control of the adjustable difficulty setting, and the memory, for executing instructions stored in the memory that, when executed, cause the at least one processor to:
display on the graphical interface, based on communication over the network, at least one representation of the exercise devices during the shared virtual exercise session, the at least one representation having a virtual speed on the graphical interface based on exercise performance of the exercise devices, and
display on the graphical interface an animation that chases the at least one representation of the exercise devices during the shared virtual exercise session, and, when reaching the at least one representation on the graphical interface, ends at least part of the shared virtual exercise session for at least one of the exercise devices, the animation having a virtual speed that is dependent on exercise performance of at least one of the exercise devices.

27. The exercise device as recited in clause 26, wherein the exercise performance is based on historical exercise performance of each respective user of each exercise device.

28. The exercise device as recited in clause 26, wherein the exercise performance is based on real-time exercise performance of each respective user of each exercise device.

29. The exercise device as recited in clause 26, wherein said communication subsystem is configured to communicate with a server over the Internet, wherein the virtual speed of the animation is calculated by the server.

30. The exercise device as recited in clause 26, wherein the virtual speed is dependent on a respective baseline performance target of each user of each exercise device, wherein each baseline performance target is a respective baseline exercise power target.

31. The exercise device as recited in clause 26, wherein the virtual speed is dependent on a respective baseline performance target of each user of each exercise device, wherein each baseline performance target is a respective baseline exercise speed target.

32. The exercise device as recited in clause 26, wherein the animation is virtually located on the graphical interface behind the at least one representation of the exercise devices at a start of the shared virtual exercise session.

33. The exercise device as recited in clause 26, wherein the at least one representation of the exercise devices comprises a respective avatar that each represents a respective exercise device.

34. The exercise device as recited in clause 33, wherein when the animation reaches one of the avatars on the graphical interface, at least part of the shared virtual exercise session ends for the respective exercise device represented by that avatar, and wherein the virtual speed of the avatar is re-calculated based on exercise performance of respective users of any remaining exercise devices.

35. The exercise device as recited in clause 26, wherein the at least one representation of the exercise devices comprises a single avatar that represents all of the exercise devices, the single avatar having a virtual speed on the graphical interface based on collective exercise performance of all of the exercise devices.

36. The exercise device as recited in clause 35, wherein when the animation reaches the avatar on the graphical interface, the at least one processor ends the shared virtual session for all of the exercise devices.

37. The exercise device as recited in clause 26, wherein the at least one processor is further configured to receive a command over the network to perform an adjustment to a current difficulty setting of the respective exercise device, wherein a same command is received by all of the other exercise devices to perform the same adjustment to a respective current difficulty setting of the respective other exercise device.

38. The exercise device as recited in clause 37, wherein the at least one processor is further configured to output on the graphical interface a message or animation that indicates that said adjustment is performed.

39. The exercise device as recited in clause 37, wherein the at least one processor is further configured to, when a specified event is detected, revert to said current difficulty setting.

40. The exercise device as recited in clause 26, wherein the at least one processor is further configured to control the adjustable difficulty setting of the exercise apparatus to one or more of the difficulty settings during the shared virtual exercise session, wherein the exercise apparatus comprises an adjustable resistance, wherein the adjustable difficulty setting is an adjustable resistance setting.

41. The exercise device as recited in clause 26, further comprising at least one sensor operably connected to the at least one processor and configured to detect performance data of the exercise apparatus.

42. The exercise device as recited in clause 26, wherein each exercise device has a starting difficulty setting for the shared virtual exercise session that is customized based on the respective user of the exercise device.

43. The exercise device as recited in clause 26, wherein the virtual speed is dependent on exercise performance of all of the exercise devices.

44. A system, comprising:
the exercise device as recited in clause 26; and
said one or more other exercise devices.

45. The system as recited in clause 44, further comprising a server configured to communicate over the Internet with said exercise device and with said one or more other exercised devices.

46. A system for a shared virtual exercise session over a network with a plurality of exercise devices, each of the exercise devices having a respective exercise apparatus having an adjustable difficulty setting, and each of the exercise devices having a respective display screen for displaying a respective graphical interface, the system comprising:
a communication subsystem for communicating with the plurality of exercise devices;
memory; and
at least one processor in operable communication with the communication subsystem and the memory, for executing instructions stored in the memory that, when executed, cause the at least one processor to:
determine a respective performance target of each respective user of each exercise device for the shared virtual exercise session,
receive data from each exercise device relating to exercise performance of the respective exercise device;
send data to each exercise device for outputting at least one representation of the exercise devices to the respective graphical interface during the shared virtual exercise session, and
command, when the exercise performance of the exercise devices during the shared virtual exercise session satisfies criteria based on the performance targets of the exercise devices, at least two of the exercise devices to perform a same adjustment to a respective current difficulty setting of the respective exercise device.

47. The system as recited in clause 46, wherein the criteria is based on collective exercise performance of all of the exercise devices compared to a collective performance target based on all of the respective performance targets of the exercise devices.

48. The system as recited in clause 46, wherein the criteria is collective exercise performance of all of the exercise devices being below a collective performance target based on all of the respective performance targets of the exercise devices.

49. The system as recited in clause 46, wherein the criteria is collective exercise performance of all of the exercise devices being above a collective performance target based on all of the respective performance targets of the exercise devices.

50. The system as recited in clause 46, wherein the system is a server configured to communicate over the Internet with said exercise devices.

51. The system as recited in clause 46, wherein the server is a cloud server.

52. The system as recited in clause 46, wherein the at least one processor is further configured to cause each graphical interface to output a message or animation to the graphical interface that indicates that said same adjustment is performed.

53. The system as recited in clause 46, further comprising the exercise devices.

54. The system as recited in clause 46, wherein each respective performance target is a respective exercise power target.

55. The system as recited in clause 46, wherein each respective performance target is a respective exercise speed target.

56. The system as recited in clause 46, wherein when a specified event is detected by the at least one processor, the at least one processor is further configured to command said exercise devices revert to said respective current difficulty setting.

57. The system as recited in clause 46, wherein said same adjustment comprises a same differential change from said respective current difficulty setting of said exercise devices.

58. The system as recited in clause 57, wherein said same differential change is incremented or decremented by a unit of difficulty level defined by the respective exercise device.

59. The system as recited in clause 46, wherein the same adjustment is caused concurrently on the exercise devices.

60. The system as recited in clause 46, wherein the exercise apparatus comprises an adjustable resistance, wherein the adjustable difficulty setting is an adjustable resistance setting.

61. The system as recited in clause 46, wherein each performance target is calculated by the at least one processor based on historical exercise performance of each respective user of each exercise device.

62. The system as recited in clause 46, wherein the at least one processor is further configured to send data to each exercise device for displaying on the respective graphical interface an animation that chases the at least one representation of the exercise devices during the shared virtual exercise session, the animation having a virtual speed that is dependent on all respective performance targets of each respective user of each exercise device.

63. The system as recited in clause 62, wherein the at least one representation of the exercise devices comprises a respective avatar that each represents a respective exercise device.

64. The system as recited in clause 63, wherein when the animation reaches one of the avatars on the graphical interface, at least part of the shared virtual exercise session ends for the respective exercise device represented by that avatar, and wherein the virtual speed of the avatar is re-calculated by the at least one processor based on all performance targets of the respective user of any remaining exercise devices.

65. The system as recited in clause 62, wherein the at least one representation of the exercise devices comprises a single avatar that represents all of the exercise devices, the single avatar having a virtual speed on the graphical interface based on collective exercise performance of all of the exercise devices.

66. The system as recited in clause 65, wherein when the animation reaches the avatar on the graphical interface, the shared virtual exercise session ends for all of the exercise devices.

67. The system as recited in clause 62, wherein the animation is virtually located on the graphical interface behind the at least one representation of the exercise devices at a start of the shared virtual exercise session.

68. The system as recited in clause 46, wherein said at least one representation of the exercise devices comprises an avatar that has a virtual speed on the graphical interface based on determined exercise performance of the exercise devices.

69. The system as recited in clause 46, wherein said at least one representation of the exercise devices comprises a respective avatar that each represents a respective exercise device, each avatar has a virtual speed on the graphical interface based on determined exercise performance of the respective exercise device.

70. The system as recited in clause 46, wherein each exercise device has a starting difficulty setting for the shared virtual exercise session that is customized based on the respective user of the exercise device.

71. The system as recited in clause 46, wherein the memory stores data from previous virtual exercise sessions for said determining of the respective performance target of each respective user of each exercise device.

72. A method for a shared virtual exercise session with one or more other exercise devices over a network, each of the other exercise devices having a respective exercise apparatus having an adjustable difficulty setting, the method being executed by at least one processor of an exercise apparatus having an adjustable difficulty setting, a display screen configured to display a graphical interface, and a user interface device, the method and comprising:

display on the graphical interface, based on communication over the network, at least one representation of users of the exercise devices during the shared virtual exercise session, receive a user input command from the user input device during the shared virtual exercise session, and in response to the user input command, cause a same adjustment to a respective current difficulty setting of at least two of the exercise devices during the shared virtual exercise session.

73. A non-transitory computer-readable medium containing instructions executable by at least one processor for a shared virtual exercise session with one or more other exercise devices over a network, and wherein the at least one processor is part of an exercise apparatus having an adjustable difficulty setting, a display screen configured to display a graphical interface, and a user interface device, the instructions comprising:

instructions for displaying on the graphical interface, based on communication over the network, at least one representation of users of the exercise devices during the shared virtual exercise session, instructions for receiving a user input command from the user input device during the shared virtual exercise session, and instructions for, in response to the user input command, causing a same adjustment to a respective current difficulty setting of at least two of the exercise devices during the shared virtual exercise session.

In accordance with an example embodiment, there is provided a non-transitory computer-readable medium containing instructions executable by a processor for performing any one of or all of the described methods. In accordance with an example embodiment, there is provided a processor-implemented method for performing any one of or all of the described functions described with respect to any of the processors.

In the described methods, the boxes may represent events, steps, functions, processes, modules, state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

While some example embodiments have been described, at least in part, in terms of methods, a person of ordinary skill in the art will understand that some example embodiments are also directed to the various components for performing at least some of the aspects and features of the described processes, be it by way of hardware components, software or any combination of the two, or in any other manner. Moreover, some example embodiments are also directed to a pre-recorded storage device or other similar computer-readable medium including program instructions stored thereon for performing the processes described herein. The computer-readable medium includes any non-transient storage medium, such as RAM, ROM, flash memory, compact discs, USB sticks, DVDs, HD-DVDs, or any other such computer-readable memory devices.

It will be understood that the devices described herein include one or more processors and associated memory. The memory may include one or more application program, modules, or other programming constructs containing computer-executable instructions that, when executed by the one or more processors, implement the methods or processes described herein.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprises of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The invention claimed is:

1. An exercise device for a shared virtual exercise session with one or more other exercise devices over a network, each of the other exercise devices having a respective exercise apparatus having an adjustable difficulty setting, each of the other exercise devices being a peer device to the exercise device, the exercise device comprising:
   an exercise apparatus having an adjustable difficulty setting;
   a display screen configured to display a graphical interface;
   a user input device;
   a communication subsystem for communicating over the network;
   memory; and
   at least one processor in operable communication with the display screen, the user input device, a control of the adjustable difficulty setting, and the memory, for executing instructions stored in the memory that, when executed, cause the at least one processor to:
   display on the graphical interface, based on communication over the network, at least one representation of users of the exercise devices during the shared virtual exercise session,
   control the adjustable difficulty setting of the exercise apparatus to one or more of the difficulty settings during the shared virtual exercise session,
   receive a user input command from the user input device during the shared virtual exercise session,
   in response to the user input command, cause a same adjustment to a respective current difficulty setting of said exercise device and said one or more other exercise devices, and
   receive a command over the network from one of the other exercise devices during the shared virtual exercise session, and in response to the receiving the command, performing the control of the adjustable difficulty setting of the exercise apparatus to a second same adjustment as the one of the other exercise devices.

2. The exercise device as claimed in claim 1, wherein said one or more other exercise devices are identical to said exercise device.

3. The exercise device as claimed in claim 1, wherein when a specified event is detected, said exercise device and said one or more other exercise devices revert to said respective current difficulty setting.

4. The exercise device as claimed in claim 3, wherein the specified event is passage of a specified period of time.

5. The exercise device as claimed in claim 1, wherein said same adjustment comprises a same differential change from said respective current difficulty setting of said exercise device and said one or more other exercise devices.

6. The exercise device as claimed in claim 5, wherein said same differential change is incremented or decremented by a unit of difficulty level defined by the respective exercise device.

7. The exercise device as claimed in claim 1, wherein the user input device includes a button, wherein said user input command is a single activation of the button, wherein the causing of the same adjustment is performed by the at least one processor in response to the single activation of the button of the user input command.

8. The exercise device as claimed in claim 7, wherein the display screen comprises a touch screen, wherein the button is a touch screen button on the touch screen.

9. The exercise device as claimed in claim 7, wherein the button is a hardware button.

10. The exercise device as claimed in claim 1, wherein the network comprises a Wide Area Network (WAN) and/or a Local Area Network (LAN).

11. The exercise device as claimed in claim 1, wherein said communication subsystem is configured to communicate with a server over the Internet, wherein said causing said adjustment is performed by at least sending a communication to the server.

12. The exercise device as claimed in claim 1, wherein said at least one representation comprises an avatar that has a virtual speed on the graphical interface based on determined exercise performance of the exercise devices.

13. The exercise device as claimed in claim 12, wherein said determined exercise performance is exercise power of the exercise devices.

14. The exercise device as claimed in claim 1, wherein said at least one representation of the exercise devices comprises a respective avatar that each represents a respective exercise device or group of the exercise devices, each avatar has a virtual speed on the graphical interface based on determined exercise performance of the respective exercise device or group of the exercise devices.

15. The exercise device as claimed in claim 1, wherein said at least one representation of the exercise devices comprises a respective real-time video of each user of each respective exercise device.

16. The exercise device as claimed in claim 1, wherein the at least one processor is further configured to output a message or animation to the graphical interface that indicates that said same adjustment is performed.

17. The exercise device as claimed in claim 1, wherein the same adjustment is caused concurrently on said exercise device and said one or more other exercise devices.

18. The exercise device as claimed in claim 1, wherein the exercise apparatus comprises an adjustable resistance, wherein the adjustable difficulty setting is a resistance setting.

19. The exercise device as claimed in claim 1, wherein the exercise device comprises a flywheel that provides resistance for the adjustable difficulty setting.

20. The exercise device as claimed in claim 19, wherein the adjustable resistance comprises a controllable magnet, a magnetic field of the controllable magnet interacting with the flywheel to control the adjustable difficulty.

21. The exercise device as claimed in claim 1, further comprising at least one sensor operably connected to the at least one processor and configured to detect exercise performance data of the exercise apparatus.

22. The exercise device as claimed in claim 1, wherein each exercise device has a starting baseline difficulty setting for the shared virtual exercise session that is customized for each exercise device.

23. A system, comprising:
the exercise device as claimed in claim 1; and
said one or more other exercise devices, each including a respective at least one processor configured to execute the instructions of said at least one processor of said exercise device.

24. The system as claimed in claim 23, further comprising a server configured to communicate over the Internet with said exercise device and with said one or more other exercised devices.

25. The exercise device as claimed in claim 14, where the at least one processor is further configured to execute instructions stored in the memory that, when executed, cause the at least one processor to:
display on the graphical interface an animation that chases the at least one representation of the exercise devices during the shared virtual exercise session; and,
when the animation reaches the at least one representation on the graphical interface, ends at least part of the shared virtual exercise session for at least one of the exercise devices.

26. The exercise device as claimed in claim 25, wherein the animation displayed on the graphical interface has a virtual speed that is dependent on exercise performance of at least one of the exercise devices.

\* \* \* \* \*